(12) United States Patent
Sela

(10) Patent No.: US 9,769,874 B2
(45) Date of Patent: Sep. 19, 2017

(54) MOBILE TELEPHONE GATEWAY APPARATUS, COMMUNICATION SYSTEM, AND GATEWAY OPERATING SYSTEM

(71) Applicant: Yossy Sela, Jerusalem (IL)

(72) Inventor: Yossy Sela, Jerusalem (IL)

(73) Assignee: Yossy Sela, Jerusalem (IL)

( * ) Notice: Subject to any disclaimer, the term of this patent is extended or adjusted under 35 U.S.C. 154(b) by 0 days.

(21) Appl. No.: 15/333,210

(22) Filed: Oct. 25, 2016

(65) Prior Publication Data

US 2017/0041986 A1    Feb. 9, 2017

Related U.S. Application Data

(60) Division of application No. 11/161,051, filed on Jul. 21, 2005, now Pat. No. 9,521,705, which is a (Continued)

(30) Foreign Application Priority Data

May 1, 2005    (IL) .......................................... 168298

(51) Int. Cl.
*H04M 3/00* (2006.01)
*H04W 88/16* (2009.01)
(Continued)

(52) U.S. Cl.
CPC ....... *H04W 88/16* (2013.01); *H04M 1/72575* (2013.01); *H04W 12/04* (2013.01); *H04W 12/06* (2013.01)

(58) Field of Classification Search
CPC .......................... H04M 1/72525; H04W 8/245
(Continued)

(56) References Cited

U.S. PATENT DOCUMENTS

| | | | | |
|---|---|---|---|---|
| 6,591,116 B1* | 7/2003 | Laurila | ................... | H04W 8/24 455/552.1 |
| 6,990,082 B1* | 1/2006 | Zehavi | ................... | H04L 29/06 370/280 |
| 2005/0197169 A1* | 9/2005 | Son | ................... | G06K 19/07743 455/572 |

* cited by examiner

*Primary Examiner* — Chuck Huynh

(57) ABSTRACT

A mobile telephone gateway and communication routing device (MPG) (121) disclosed by the present invention is coupled through an electrical signaling transmission medium with a mobile telephone (100) operative on a first communication network in accordance with a first communication protocol, for adding communication capabilities through at least a second communication network in accordance with a second communication protocol. A mobile communication system (150) is disclosed, comprising MPG (121) placed in-between mobile phone (100) and battery (118) and Subscriber Identification Module (SIM) card (117). MPG connects to the SIM interface of mobile phone (100), using which it wraps SIM functionalities and controls call management. It connects to the data/signaling interface of mobile phone (100), using which it communicates with it, while communication with the second network using another communication means. It may optionally connects to an accessory device interface of mobile phone (100) such as a TA/TE or a USB OTG interface, thereby enabling communication between the mobile phone and wireless data terminals of the second network. In a preferred embodiment of the present invention, a MPG is provided for use with a mobile phone operative on a mobile communication network such as GSM, adding communication capabilities through a wireless communication network such as Bluetooth or Wi-Fi. Furthermore, gateway applications are provided to facilitate or support communication through at least the second network in accordance with mobile web (Continued)

protocols and technologies such as Mobile IP, mobile SIP, and mobile VoIP.

29 Claims, 17 Drawing Sheets

Related U.S. Application Data continuation-in-part of application No. PCT/IL03/00906, filed on Nov. 2, 2003.

(51) Int. Cl.
    *H04W 12/06*     (2009.01)
    *H04W 12/04*     (2009.01)
    *H04M 1/725*     (2006.01)

(58) Field of Classification Search
    USPC .................. 455/552.1, 572, 558, 456.3, 418; 370/280
    See application file for complete search history.

Fig. 1 (Piror Art)

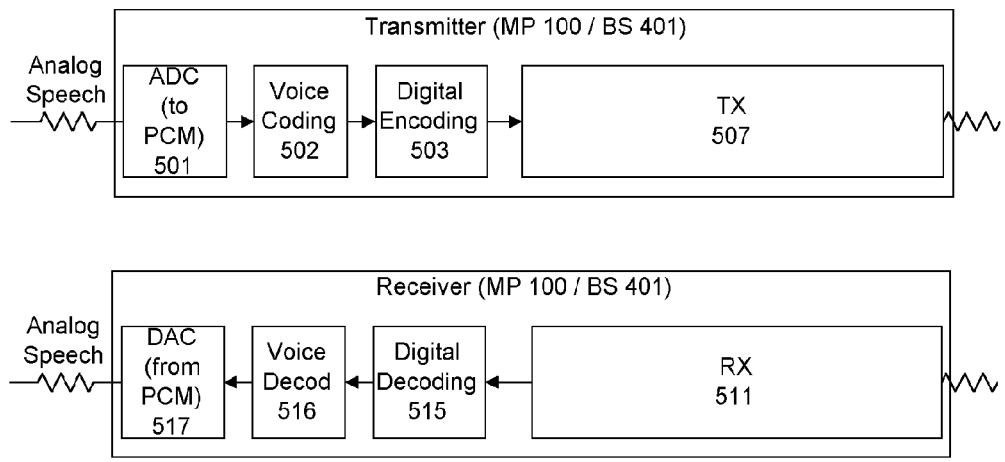
Fig. 15    (Prior Art)
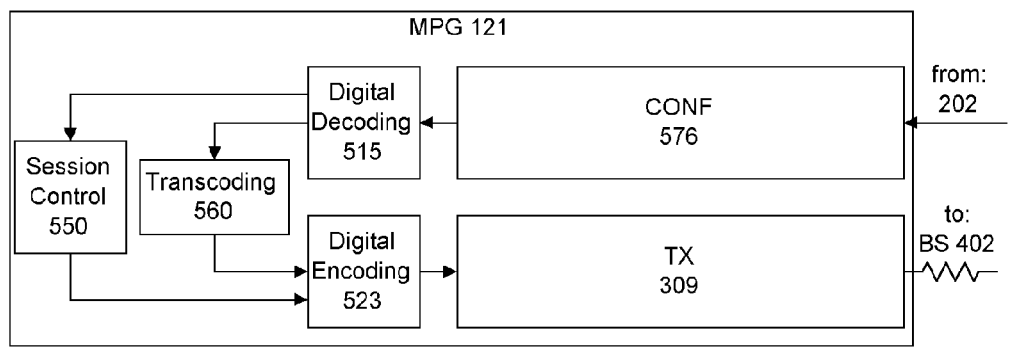
Fig. 16
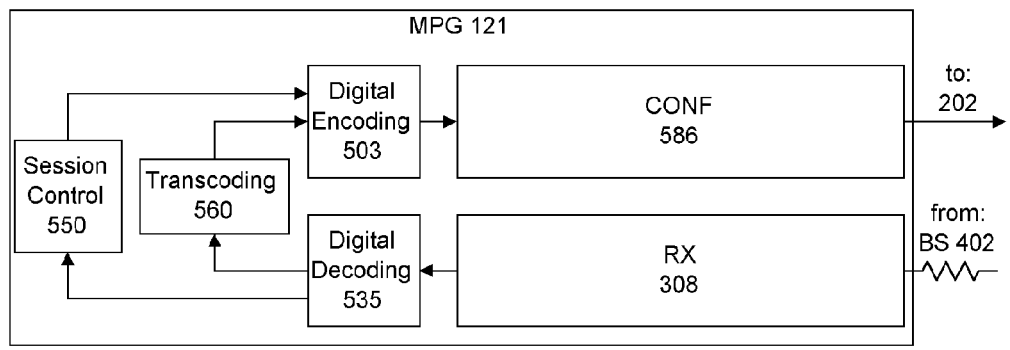
Fig. 17

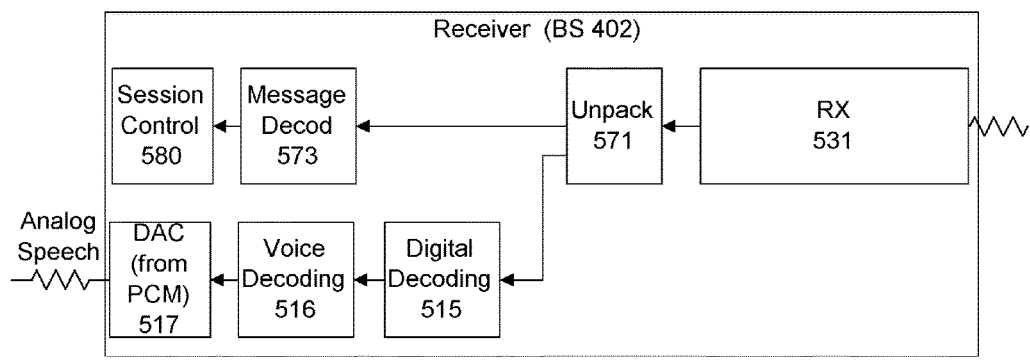
Fig. 18    (Prior Art)
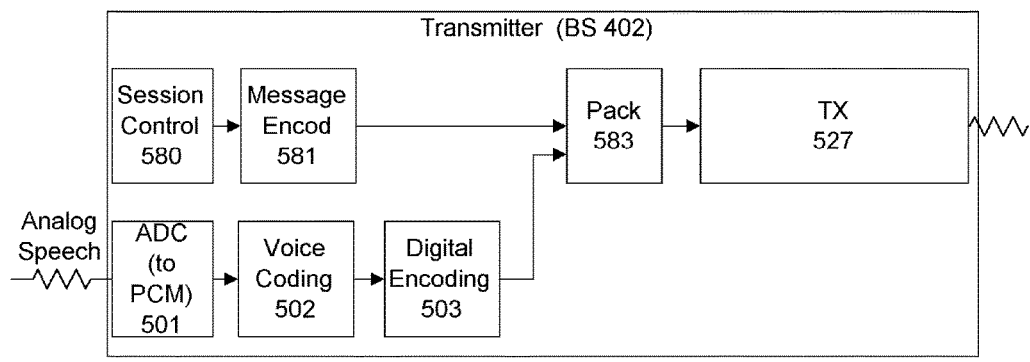
Fig. 19    (Prior Art)

MOBILE TELEPHONE GATEWAY APPARATUS, COMMUNICATION SYSTEM, AND GATEWAY OPERATING SYSTEM

CROSS REFERENCE TO RELATED APPLICATION(S)

The present application is a divisional application of U.S. application Ser. No. 11/161,051, entitled "Mobile Telephone Gateway Apparatus, Communication System, and Gateway Operating System", filed Jul. 21, 2005.

The present application is a continuation-in-part of International Application No. PCT/IL2003/00906, filed Nov. 2, 2003 by the inventor of the present invention and titled "Mobile Telephone Gateway Apparatus, Communication System, and Gateway Operating System".

The present application also claims the benefit of Application No. 168298 filed May 1, 2005 by the inventor of the present invention to the Israeli Patent Office, titled "Mobile Telephone Gateway Apparatus, Communication System, and Gateway Operating System".

All these patent applications are expressly incorporated herein by reference as though fully set fourth in full.

TECHNICAL FIELD

The present invention relates to mobile telephones operative on first communication network. More particularly, the present invention relates to a gateway device and methods that enable communication between a mobile phone (MP) and a second communication network.

BACKGROUND ART

Wireless communication networks in general, and cellular networks in particular, defer in various issues, including the frequency band they use, the communication protocol they apply, and to some extent, the types of services they support. Examples of frequency bands currently in use for cellular communication are the 800-900 MHz and 1800-1900 MHz frequency bands in the United State, and the 800-900 MHz in Europe. Examples of communication protocols currently in use are the second generation GSM (Global System for Mobile communications) and CDMA (Code Division Multiple Access) standards and the third generation UMTS (Universal Mobile Telecommunications System, also known as W-CDMA) and CDMA2000 standards. Examples of types of services are the standard circuit-switched voice call services, the packet-switched services, short message services (SMS), and Internet-based services based on the Internet Protocol (IP) and the Wireless Application Protocol (WAP). An example of a short-range wireless communication standard is the Bluetooth/IEEE 802.15.1 protocol, operating on an Industry, Scientific, and Medicine (ISM) frequency band such as the 2.4-2.483 GHz.

The vast majority of MPs sold today are either single-band or dual-band devices registered for service with a certain service provider, where service accessibility is enabled by a Subscriber Identification Module (SIM) card placed within the mobile phone. Triple-band MPs are also becoming available, with two cellular communication bands, and a third personal wireless communication band such as a Bluetooth™-based network.

When a person purchases a mobile phone, usually she also becomes a subscriber of a certain service provider. Once a person becomes a subscriber of a cellular network, she is bound to use her mobile phone only within the network to which it has been designed for and to which she has subscribed to.

Several methods and apparatuses have been devised for enabling MPs for communication through a different network, some use satellite networks, some use standard landline networks, and some use private wireless networks, for establishing a communication link with the cellular network service provider.

A different approach for accessing a second network is to incorporate a gateway within the communication path established between the MP and a terminal of the other network. In one configuration, the gateway is incorporated in-between the first and second networks. In another configuration, the gateway is incorporated in-between a data terminal and the MP, where the MP serves as the entry point for the data terminal to the network. In yet another configuration, the gateway is incorporated within the MP itself and is used as an access point for data terminals to the network. Also, multiple gateways may be incorporated within the same communication path. In these configurations, a link has to be established between the MP and the first network.

In yet another configuration, the MP, data terminals, and the gateway are communicating through a short-range network, and the gateway enables accessing a plurality of networks, including cellular networks, the PSTN, and a local area network. In this configuration, the MP cannot communicate with the cellular network unless a gateway is within range or unless it is equipped with means for communicating on both the short range and the cellular networks. Therefore, the gateway is not transparent to the MP, since the design of the MP has to conform to the network and protocol of the gateway device.

In another aspect of the prior art, methods and apparatuses have been developed for adding service accessibility to MPs by extending the SIM card module to encompass multiple SIM cards. This has been done in two major ways: by adding another built-in SIM card reader and SIM card socket within the MP, and by coupling an accessory device with multiple SIM card sockets and a processor for controlling them. These extensions to service accessibility, however, handle only the accessibility phase of the communication process, while the communication with the network is handled by the MP. Therefore, this solution is suitable for accessing networks within the frequency bands and in accordance with the communication protocols supported by the MP.

In yet another aspect of the prior art, various mobile web protocols technologies for wireless and mobile Internet connectivity and service provisioning have been developed, including: WAP (Wireless Access Protocol); Mobile IP; Mobile SIP (Session Initiation Protocol); mobile VoIP (Voice over IP); mobile versions of web technologies such as SVG (Scalable Vector Graphics), SMIL (Synchronized Multimedia), and SRGS (Speech Recognition). The underlying concept behind these and other Internet-related technologies is the extension and adaptation of the connectivity and service provisioning of the Internet to wireless and mobile applications.

In yet another aspect of the prior art, several architectures, technologies, and protocols related to fixed-mobile convergence (FMC) have been developed. Narrow scale, network-level convergence technologies include the Unlicensed Mobile Access (UMA) specification, which provides a model of convergence between PLMNs and PSTNs. Large scale, application-service level convergence technologies include the IP Multimedia Subsystem (IMS) specification and architecture of 3GPP and its equivalent MultiMedia Domain (MMD) specification and architecture of 3GPP2, both provide an Internet-based model of convergence between various communication networks.

In yet another aspect of the prior art, non-telephony wireless applications have been developed in parallel with wireless telephony applications. Examples of such non-telephony wireless applications include: broadcasting, home automation and control, and personal healthcare. Such applications may be installed in user devices such as a MP for providing their functionalities.

In yet another aspect of the prior art, a variety of specifications have been developed for purposes such as WLANs, mobile/wireless Internet browsing (Wireless IP, Mobile IP), broadband wireless access (BWA) communication, and digital broadcasting. Each one of these specifications defers in some technological aspects such as frequency band, signaling method (such as TDD, CDMA, and OFDM), and transceiver and antenna circuitries, and claims superiority upon the others in some performance aspects such as coverage range, effective bandwidth, interference reduction, interference recovery and control, mobility, power consumption, and cost. Examples of wireless communication networks and protocols include, but not limited to: GSM; CDMA; UMTS; CDMA2000; TD-SCDMA; GPRS; EDGE; Bluetooth; IEEE 802.11X (also known as Wi-Fi), wherein the 'X' stands for any variant, addition, or amendment to the base specification, including, but not limited to 'a', 'b', 'e', 'g', 'h', 'i', 'n', and 'p', all collectively termed hereinafter as 802.11; IEEE 802.15.3Y (also known as Ultra WideBand, or UWB), wherein the 'Y' stands for any variant, addition, or amendment to the base specification, including, but not limited to 'a', all collectively termed hereinafter as 802.15.3; IEEE 802.15.4Z (also known as ZigBee), wherein the 'Z' stands for any variant, addition, or amendment to the base specification, including, but not limited to 'a', all collectively termed hereinafter as 802.15.4; IEEE 802.16U (also known as WiMax), wherein the 'U' stands for any variant, addition, or amendment to the base specification, including, but not limited to 'a', 'd', 'e', and 'f', all collectively termed hereinafter as 802.16; HIPERLAN (High Performance Radio LAN), which includes HIPERLAN/1, HIPERLAN/2, HIPERACCESS, and HIPERLINK; ETSI BRAN (Broadband Radio Access Networks) and HIPERMAN (HIgh PErformance Metropolitan Area Networks). In addition, currently in development are standards such as IEEE 802.20, IEEE 802.21 and IEEE 802.22, termed hereinafter as 802.20, 802.21, and 802.22, respectively. Other specifications developed in an attempt to merge mobile networks with wireline networks (such as the PSTN or cable TV) and/or with WLANs and Internet communications include: Digital Enhanced Cordless Telephony (DECT) specification; World Digital Cordless Telephony (WDCT); UMA (Unlicensed Mobile Access) specification. Other specifications which have been developed for wireless broadcasting applications include: DAB (Digital Audio Broadcasting); DVB (Digital Video Broadcasting); DVB-T (Terrestrial DVB); Digital Multimedia Broadcasting (DMB).

The main form that is applied in the prior art for supporting these and other technologies is by embedding the desired technologies within the MP from the start, and providing the necessary support in the communication networks. However, once a MP has been manufactured, it is bound to the specific technologies embedded within it and therefore cannot benefit from advancement in new technologies as well as from improvements of the embedded technology. In addition, since the use of a certain embedded technology depends on it being supported by compatible equipment of the communication network (such as access points and access control services) deployed in appropriate places such as customer premises, airports, or throughout urban areas, its utilization might be in question. Furthermore, even when the technology embedded within a MP and the technology of the access network are the same, compatibility might still not be guaranteed, since various restrictions might be set by manufacturers and network operators on the ability of a MP to interoperate with an arbitrary communication network, or since security information required to authenticate and encode/decode data exchanged between the MP and the communication network might not be accessible.

Information on primary technologies and communication protocols to which the present invention relates may be found, among other ways, in Internet sites as follows:

| Protocol/technology | Internet site |
| --- | --- |
| 3GPP protocols (e.g., GSM, UMTS) | http://www.etsi.org http://www.3gpp.org |
| 3GPP2 protocols (CDMA-based protocols) | http://www.3gpp2.org |
| IEEE protocols | http://www.ieee.org |
| WLAN protocols such as DECT, HIPERLAN, and BRAN | http://www.etsi.org |
| Bluetooth | http://www.bluetooth.org |
| WiMAX | http://www.ieee.org http://www.wimaxforum.org http://www.intel.com |
| Mobile web protocols and technologies | http://www.ietforg http://www.sipforum.org http://www.sipcenter.org http://www.voip-info.org http://www.voip.org.uk |
| Unlicensed Mobile Access (UMA) | http://www.umatechnology.org http://www.itu.int |
| Fixed-Mobile Convergence (FMC) | http://www.itu.int |
| Internet Multimedia Subsystem (IMS) | http://www.itu.int |
| ISO 7816 protocol (MP-SIM interface protocol) | http://www.iso.org |

Therefore, there is a need for an apparatus and method transparent to the MP, for adding communication capabilities through a second network to a standard MP, such that a communication path established between the MP and the second network does not comprise a communication link between the MP and the first network.

DISCLOSURE OF INVENTION

It is an object of the present invention to provide a mobile phone gateway and communication routing apparatus. A mobile phone gateway and communication routing apparatus (MPG) 121 (or in short, mobile phone gateway) is physically coupled with a mobile phone (MP) operative on at least a first communication network (or in short, first network) in accordance with at least a first communication protocol (or in short, first protocol), for providing wireless communication capabilities through at least a second communication network (or in short, second network) in accordance with at least a second communication protocol (or in short, second protocol). Basically, an MPG comprises: means for transpassing data/signaling communication between an MP and at least the second network; means for controlling and wrapping SIM functionalities, said SIM functionalities provided to the MP and to MPG by one or more SIM card logics, wherein a SIM card logic may be of one of the following types: SIM application means comprised in MPG; a SIM card that is coupled with MPG through a SIM interface means of MPG. The specific configuration of the means for controlling and wrapping SIM functionalities is determined in accordance with the types of SIM card logics which are controlled and wrapped by it. In an embodiment of the present invention, MPG comprises: a SIM application means for providing SIM services when communicating with the second network through MPG; a SIM interface means for coupling with a SIM card (117) which is used for providing SIM services when the MP communicates with the first network. In yet another embodiment of the present invention, MPG comprises SIM interface means for coupling with a SIM card which is used for providing SIM services when communicating with either the first or the second network. In yet another embodiment of the present invention, MPG comprises SIM application means which is used for providing SIM services when communicating with either the first or the second network. Hence, The means for controlling and wrapping SIM functionalities may be configured in different manners in accordance with the relevant embodiment of the present invention.

It is yet another object of the present invention to provide a communication system 150 for providing communication capabilities through a plurality of communication networks using a plurality of communication protocols, wherein the communication system comprises: a mobile phone 100 operative in accordance with at least first communication network and at least first communication protocol; a SIM card 117; a mobile phone gateway in accordance with the present invention; a collection of interfaces between the mobile phone and the mobile phone gateway and between the mobile phone gateway and the SIM card. Using such a communication system, one or more communication paths may be established between the mobile phone and stations of the second network through the mobile phone gateway, wherein the communication paths may be the same or different. Furthermore, the coupling of the MP with MPG as provided by the present invention is such that communication system 150 may function as a standard mobile or wireless station of the second network as well as of the first network.

It is yet another object of the present invention to provide a gateway operating system for a mobile phone gateway apparatus, wherein the gateway operating system initiates, accepts, controls, manages, and terminates one or more communication sessions between a mobile phone of the communication system and at least a second communication network by wrapping SIM functionalities, and provides gateway applications and protocol conversion services to said communication sessions. The gateway applications may be in compliance with the same or with different specifications.

Throughout the present invention, the term 'transpassing' should be construed as relating to the combination of: communicating (i.e., transmitting and receiving) data and/or signaling in-between two or more entities by a third entity using communication networks and protocols; optionally, transcoding or tunneling the exchanged data and/or signaling from one communication protocol to another communication protocol. Accordingly, the means and methods for transpassing may include means and methods such as: means and methods for data/signaling communication; means and methods for transcoding data/signaling between communication protocols; means and methods for tunneling data/signaling between communication protocols; means and methods for controlling and processing communication activities.

Throughout the present invention, the term 'mobile phone' (MP) should be construed as relating to a portable device comprising wireless communication capabilities, such as mobile phones, PDAs, smartphones, and other handheld devices.

Throughout the present invention, the term 'base station' should be construed as relating to network interface equipment such as: base stations; customer premises base stations; base transceiver stations; access points; cordless-to-landline line interface base units, typically used for wireless communication via a PSTN; wireless-to-landline broadband interface base units, typically used for wireless Internet communication via a PSTN or a cable TV network.

Throughout the present invention, the term 'station' should be construed as relating to another user device such as a mobile phone, a data terminal, an access point, or a base station. The term 'data terminal' should be construed as relating to any apparatus which is capable of communicating with a wireless communication network via a mediating apparatus such as a gateway or a mobile phone. Examples of data terminals include wireless headphones, PDAs with local area networking capabilities, input devices, pointing devices, etc.

Many models of MPs come with a removable SIM card. According to an aspect of the present invention, MPG 121 plugs into the SIM interface means of the MP for the purpose of taking over SIM responsibilities provided by SIM cards to MPs, such as the call control (GSM SIM service no. 28), authentication, ciphering, event handling, proactive commands (GSM SIM service no. 29), and user interface services (GSM SIM service no. 27) originally provided by the MP's SIM card. The MP's SIM card is plugged to the MPG for the purpose of relaying requests, events and responses in-between the MP and its original SIM card wherever appropriate.

Typically, a battery is coupled to MPs through a power/recharge connector. According to an aspect of the present invention, MPG may optionally plug on one hand to the battery and on the other hand to the power/recharge connector of the MP, such that it draws power from the battery while relaying power/recharging in-between the battery and the MP.

Typically, MPs are equipped with latching means for securing them to an external accessory device such as a hands-free cradle. According to an aspect of the present invention, MPG may optionally comprise mating latching means and may be formed such that it can be secured to the MP after removing the MP's battery and SIM card. MPG may optionally feature latching means on its rear side, such that the battery and the SIM card can be secured to it, as well as accessory devices designed for use with the particular MP.

According to an aspect of the present invention, an MPG may utilize services and data of SIM card 117 when communicating with the second network. This facilitates reducing complexity of MPG and concentrating SIM data and services in a single device (i.e., a SIM card or a SIM application means) to the convenience of the user. Moreover, using this feature, authentication, ciphering, and other SIM services related to both the first and the second networks may be provided by SIM card 117, in which case, the SIM application means of MPG may delegate service requests such as authentication and ciphering key requests to SIM card 117, and delegate responses to the MP. More complex procedures may be devised in similar manner, such as: procedures wherein MPG participates in the processing of requests and/or alters responses received from SIM card 117 prior to transmitting them to the MP.

According to an aspect of the present invention, an MPG may be configured or set to provide SIM services to the MP when accessing both the first and the second networks. In an embodiment of the present invention, MPG completely replaces SIM card 117 as the authentication and ciphering means with the first network, thus there is no need for a SIM card. In yet another embodiment of the present invention, MPG comprises means for coupling with one or more SIM cards.

According to an aspect of the present invention, MPG facilitates proper initialization, coordination and operation of, and between, the MP, MPG, and the SIM card logics that are coupled with MPG. In an embodiment of the present invention, MPG facilitates proper initialization, coordination and operation of, and between the MP, MPG, and SIM card 117, via the SIM interface between the MP and MPG and the SIM interface between MPG and SIM card 117.

Some models of MP comprise coupling means that facilitate the coupling of the MP with an external device through an electrical signaling transmission medium for the purpose of data/signaling communication with a communication network through that external device. An electrical signaling transmission medium may be of one of several types, including, but not limited to: a r.f. transmission line such as a coaxial line; a digital baseband communication interface means through which the MP may be coupled with an external transceiver; a digital communication interface means such as a Universal Serial Bus On-the-Go (USB OTG) interface means, a PCMCIA (Personal Computer Memory Card International association) interface means type I, II, or III, a PCI Express interface means, an IEEE 1394 interface means, an RS 232 interface means, or some proprietary digital communication interface means. According to an aspect of the present invention, communication of data and signaling between an MPG and the MP with which it couples is made through an electrical signaling transmission medium.

Some models of MP feature accessory device interface means through which accessory devices may be coupled with the MP and further, communicate with the network through the MP. Examples of such accessory device interfaces include, but not limited to: Terminal Adapter/Terminal Equipment (TA/TE) interface, compliant with some TA/TE protocol such as the GSM TA/TE specifications; USB; USB OTG; PCMCIA; PCI Express; IEEE 1394; RS232. According to an aspect of the present invention, an MPG may optionally plug into the accessory device interface means of the MP such that it can serve as a network interface to wireless data terminals of the second network. Here, a communication path comprises: a first path between a wireless device and the MP, passing through the accessory device interface between the MP and MPG; a second path between the MP and the second network, passing through the data/signaling (D/S) interface between the MP and MPG.

In an embodiment of the present invention, an MPG is configured such that a digital-form D/S interface and an accessory device interface are established through the same interface means. For example, USB OTG interface means may be used to establish both a first path between a wireless data terminal of the second network and the MP, and a second path between the MP and the second network. In yet another embodiment of the present invention, an MPG is configured such that a digital-form D/S interface and an accessory device interface are establish through different interface means. For example, a first path between a wireless data terminal of the second network and the MP is established through a TA/TE interface, whereas a second path between the MP and the second network is established through a USB OTG interface.

In some types of content and communication applications such as multimedia over 3G-324M (the 3GPP version of H.323), several channels, such as text, graphics, video, audio, and control channels may be multiplexed into a single communication link. A gateway device may then be required to tunnel some of the channels while transcoding the other channels. Other issues that a gateway may have to handle include synchronization and quality of service. In an aspect of the present invention, an MPG may be provided with means and methods for supporting channel multiplexing and demultiplexing over a communication link, and protocol conversion methods which transcode some of the channels while tunneling the others.

According to an aspect of the present invention, an MPG may be provided with means and methods for providing communication with a core network such as the Internet, through one or more intermediate networks such as radio access networks and visitor networks. According to a further aspect of the present invention, an intermediate network may be transparent or non-transparent to a communication session established through MPG with a core network.

When an MP is provided with more than one radio access technology, such as GSM, Bluetooth and WiFi, a process by which an access technology is being selected and set may be conducted between the MP and SIM card 117. In an aspect of the present invention, an MPG may intercept and wrap this process in order to set the MP with an appropriate or optimal radio access technology with respect to the established communication session and the specifications of MPG.

Communication devices which support a plurality of access technologies, communication networks, and/or communication protocols, often provide the user with means and methods for setting user preferences with regard to technological, service, and context requirements and constraints. Examples of such attributes include, but not limited to: quality of service, tariff, security, mobility, priority, content, time of day and day of week. According to an aspect of the present invention, an MPG may be provided with means and methods for setting user preferences with respect to MPG functionality, using the user interface of the MP with which it is coupled.

In an aspect of the present invention, an MPG may be provided with means and methods for supporting various types of traffic, including, but not limited to: conversation, streaming, interactive, background, and broadcasting.

In an aspect of the present invention, an MPG may be provided with means and methods for supporting various types of content, including, but not limited to: voice, data, text, messaging, Internet browsing, multimedia, music, audio, and video.

In an aspect of the present invention, an MPG may be provided as a platform for user applications, such as: location-based service applications, ticketing, payment, credit card, banking, remote control, wireless equipment monitoring, business applications, games, imaging, and recording.

In an aspect of the present invention, an MPG may be provided with protecting means and methods, such as anti-theft, firewall, and content filtering and control means and methods.

In an aspect of the present invention, an MPG may be provided with means and/or methods for identifying the type, version, protocol, and other identification features of the MP and/or the SIM card, such that it is able to adjust its own operation and functionality to the specific configuration it is engaged with. Examples for such means and methods include, but not limited to: means and/or methods for distinguishing between a 2G SIM card and a 3G UICC; means and/or methods for distinguishing between a SIM card class (e.g., classes A, B, and C, which respectively map into 5V, 3V, and 1.8V power restrictions); mechanical and physical means such as a protrusion for identifying a card type. These and other means and methods may be used to decide which initialization, control, access and wrapping methods to apply.

In an aspect of the present invention, an MPG may comprise a rechargeable or non-rechargeable battery in addition, or instead of being coupled with the MP's battery. Various power management policies may then be applied by MPG, including, but not limited to: creating a power supply pool comprising its own power source and the MP's power source; restricting itself to its own power source; using its own power source during idle time and/or during times of peak demand.

According to an aspect of the present invention, an MPG comprises a housing, which is formed in accordance with the housing of the MP with which it couples and in accordance with its functionality as a gateway. Various forms of housing may be provided for the same or different makes and models of mobile phones. Examples of housing designs include, but not limited to: a housing formed such that the MPG plugs into the SIM interface means, an accessory device interface means and a power/recharge interface means of the mobile phone through built-in sockets and connectors; a housing formed such that the MPG plugs into the SIM interface means and the power interface means of the mobile phone through wire strips; a housing comprising latching means using which MPG is secured to the mobile phone; a housing formed such that the MPG is placed under the original or adapted back cover of the mobile phone; a housing with a hole for an MP camera lens placed on the side of the MP to which the MPG is attached. Other housing designs, including any variation or combination of the designs above may be provided by a person skilled in the art without departing from the scope and spirit of the present invention in its broadest form.

According to an aspect of the present invention, an MPG may comprise means for reducing or minimizing electric and electromagnetic interference between itself and the MP, and means for reducing or minimizing electromagnetic radiation towards the user's head. An arrangement of components of an MPG may also be provided in which the antenna circuitry of the MPG is sufficiently distant from the antenna circuitry of the MP.

According to an aspect of the present invention, an MPG may optionally be integrated with other detachable devices or functionality, such as a memory card, a battery, or a biometric identification device.

In the design and manufacturing of wireless communication devices, various technologies, methodologies and allocation of functionalities into circuit elements may be applied, including, but not limited to: general purpose integrated circuit; Application Specific Integrated Circuit (ASIC); Application Specific Standard Product (ASSP); integrated multiband transceiver; hardware-software codesign methodologies; and Software Defined Radio (SDR). According to an aspect of the present invention, an MPG may be designed and manufactured in accordance with any technologies and/or methodologies applied to the design and manufacturing of wireless communication devices.

In an embodiment of the present invention, the first network and the first protocol are selected from: GSM; CDMA; UMTS; CDMA2000; TD-SCDMA; GPRS; EDGE; Bluetooth; IEEE 802.11; IEEE 802.15.3; IEEE 802.15.4; IEEE 802.16; IEEE 802.20; IEEE 802.22; DECT; WDCT; UMA, HIPERLAN; BRAN; HIPERMAN.

In an embodiment of the present invention, the second network and the second protocol are selected from: GSM; CDMA; UMTS; CDMA2000; TD-SCDMA; GPRS; EDGE; Bluetooth; IEEE 802.11; IEEE 802.15.3; IEEE 802.15.4; IEEE 802.16; IEEE 802.20; IEEE 802.22; DECT; WDCT; UMA, HIPERLAN; BRAN; HIPERMAN; DAB; DVB; DVB-T, DMB.

In an aspect of the present invention, an MPG may be provided with gateway applications for handling incompatibility or management and control at the transport, session, and application layers of a communication session conducted between a MP and the second network. A gateway application may support communication in two major ways, the first wherein it resolves incompatibilities between two incompatible specifications, and the second wherein it coordinates between two compatible specifications. Examples of specifications that may be supported by gateway applications include, but not limited to: IMS; WAP (Wireless Access Protocol); Mobile IP; mobile SIP; mobile VoIP; UMA; WiFi; WiMAX; mobile web technologies such as SMIL, SRGS, and SVG; i-mode; 3G-324M; Bluetooth CTP (Cordless Telephony Profile); Bluetooth ISP (Intercom Services Profile).

In a preferred mode of the present invention, an MPG is provided for use with a MP operative on a mobile communication network such as GSM, CDMA, UMTS, CDMA2000, TD-SCDMA, GPRS, or EDGE, adding communication capabilities through a wireless communication network such as Bluetooth, Wi-Fi, UMA, WiMAX, UWB, DECT, or HIPERLAN. Furthermore, gateway applications are provided to facilitate or support communication through at least the second network in accordance with mobile web protocols and technologies such as Mobile IP, mobile SIP, and mobile VoIP.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 15 schematically illustrates the processing of a voice call by an MP and a base station of a conventional cellular network.

FIG. 16-17 schematically illustrate protocol conversion of a voice call by MPG, done in accordance with the processing illustrated in FIG. 15.

FIG. 18-19 schematically illustrate an encapsulation (tunneling) method of processing a voice call by an intermediate network or gateway.

MODES FOR CARRYING OUT THE INVENTION

Figure 1:
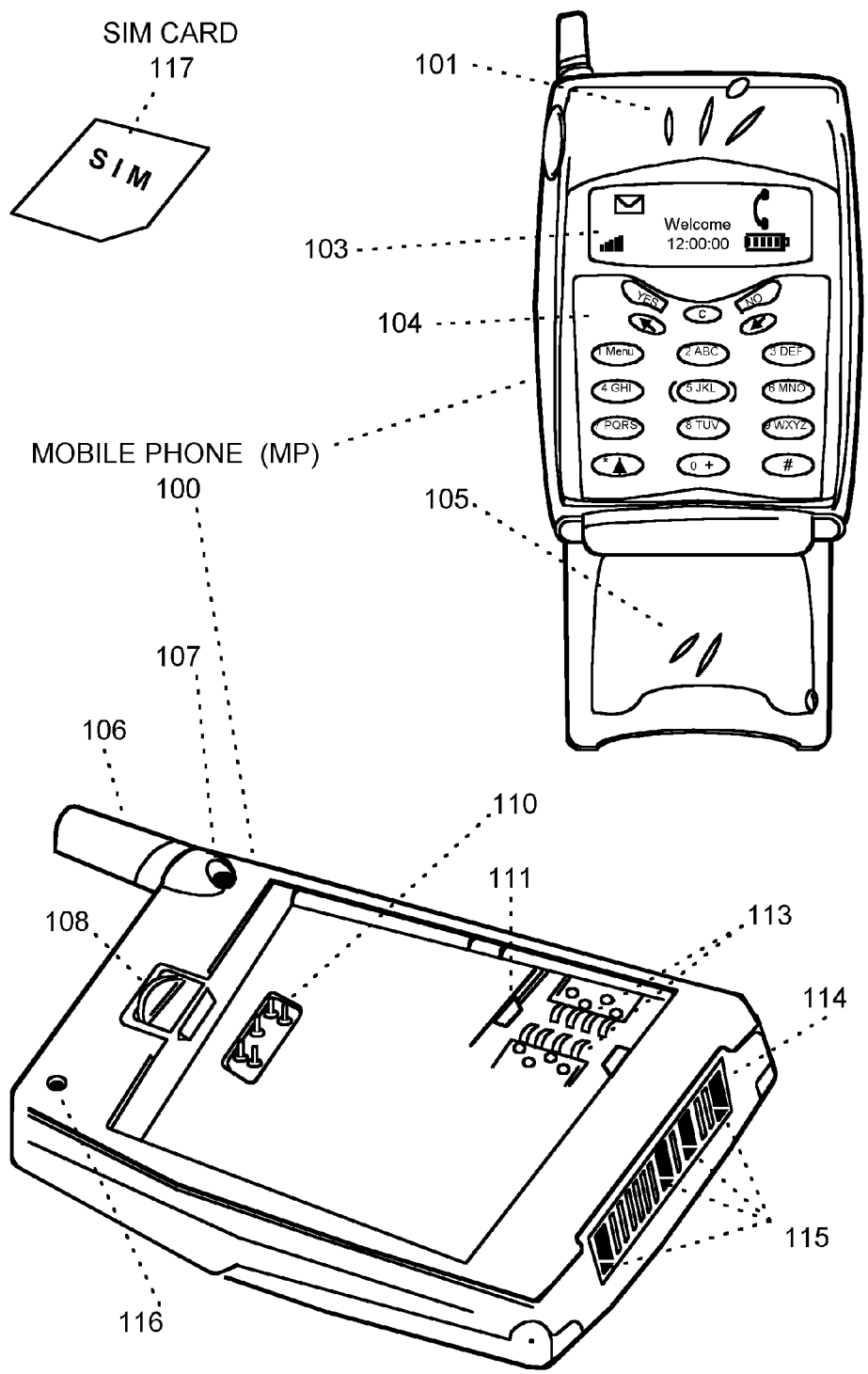
FIG. 1 illustrates an exemplary MP.

The following description relates to an exemplary MP that is operating in a GSM network. It is however noted, that the present invention is not restricted to the form, type, arrangement of components, or any other features specific to the exemplary MP other than those specified as pre-requisites in the previous sections or reflected in the claims.

In the following description, the terms "connector" and "socket" are often used to relate to physical interface means. From the point of view of the present invention, however, there is no significant difference between these terms other than convenience and simplicity of the verbal description.

In the following description, wherever a reference is made to MPG without a numeral indication, it should be construed as relating to MPG 121 as specified in the description hereinafter and in the drawings.

FIG. 1 shows an exemplary MP 100. This phone comprises: earpiece 101; display 103; keypad 104; microphone 105; antenna 106; and SIM card 117. MP 100 also features a set of connectors and sockets, including: external antenna socket 107; power/recharge connector 110; SIM card socket 113; and accessory socket 114 typically used for connecting to an accessory device such as a hands-free set, a TA/TE-compatible device, or a recharging unit. Accessory socket 114 further comprises a plurality of connecting members or contacts as well as engagement recesses 115. In addition, MP 100 further comprises: belt-clip engagement recess 116; battery clip locker 108; and SIM card locker 111.

Figure 2:
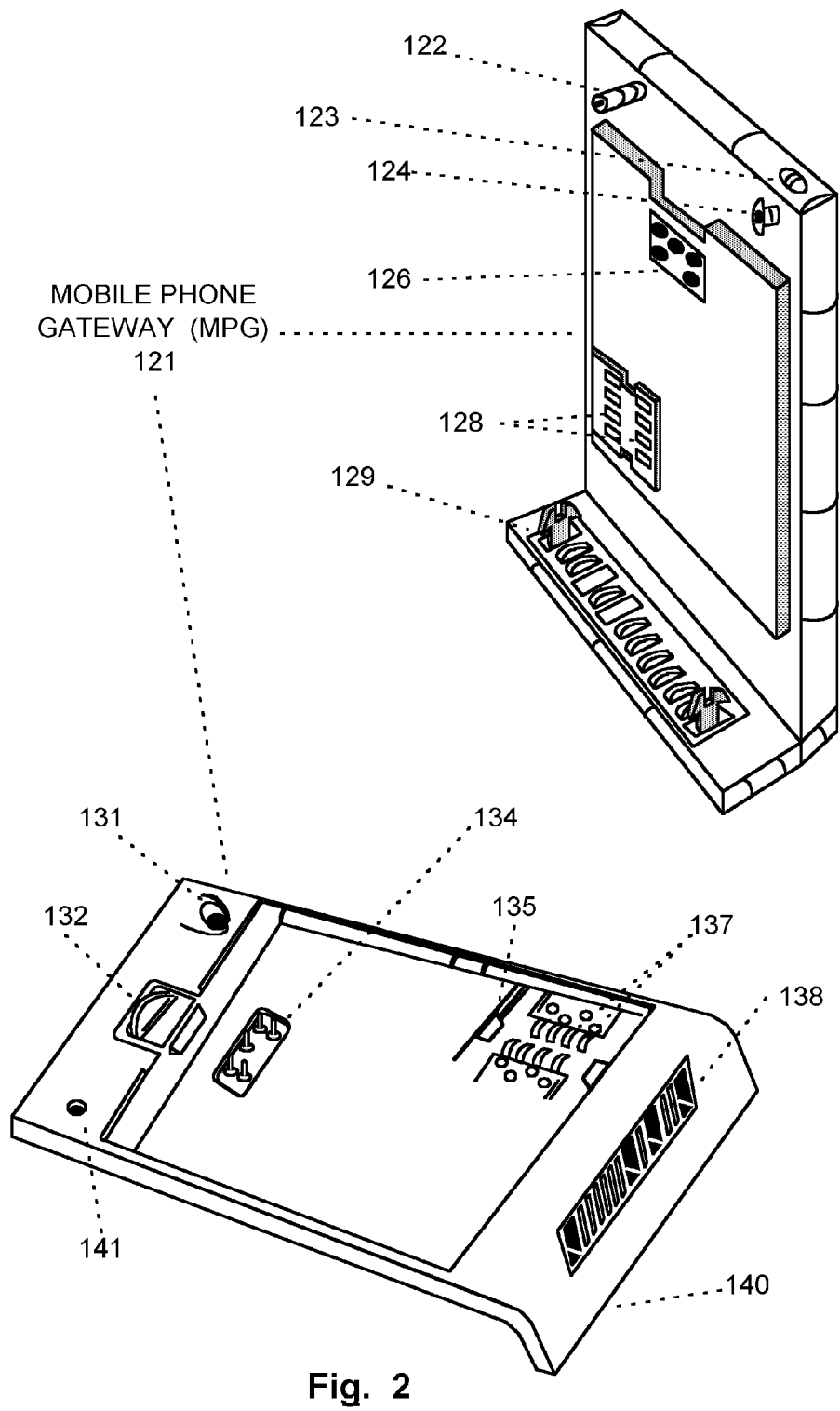
FIG. 2 illustrates an MPG designed to mate with the exemplary MP of FIG. 1.

FIG. 2 shows an embodiment of an MPG 121 designed for use with the exemplary MP 100. In the front side, MPG 121 is formed such that it fits into the niches of the SIM card and battery of MP 100 and plugs into the MP's connectors, sockets, lockers and engagement recesses. In the rear-bottom side, MPG 121 is formed to reflect the structure, connectors, sockets, lockers and engagement recesses, and their arrangement, such that the MP's SIM card 117, battery 118, and accessory devices designed for use with it, can be coupled with it through MPG 121.

Specifically, on the front side, MPG 121 comprises: r.f. connector 122; power/recharge socket 126; SIM card connector 128; and accessory device connector 129. These connectors will plug into the relevant connectors of MP 100 shown in FIG. 1. A locking/unlocking mechanism comprising an unlocking button 123, a locking recess 124, and a latching screw 142 (shown in FIG. 3), will be used to secure MPG 121 to MP 100.

On the rear-bottom side, MPG 121 comprises: external r.f socket 131; power/recharge connector 134; SIM card socket 137; and accessory device socket 138. Also, battery clip locker 132, SIM card lockers 135, and belt-clip engagement recess 141 will be used to secure SIM card 117, battery 118, and any accessory device, to MPG 121.

Figure 3:
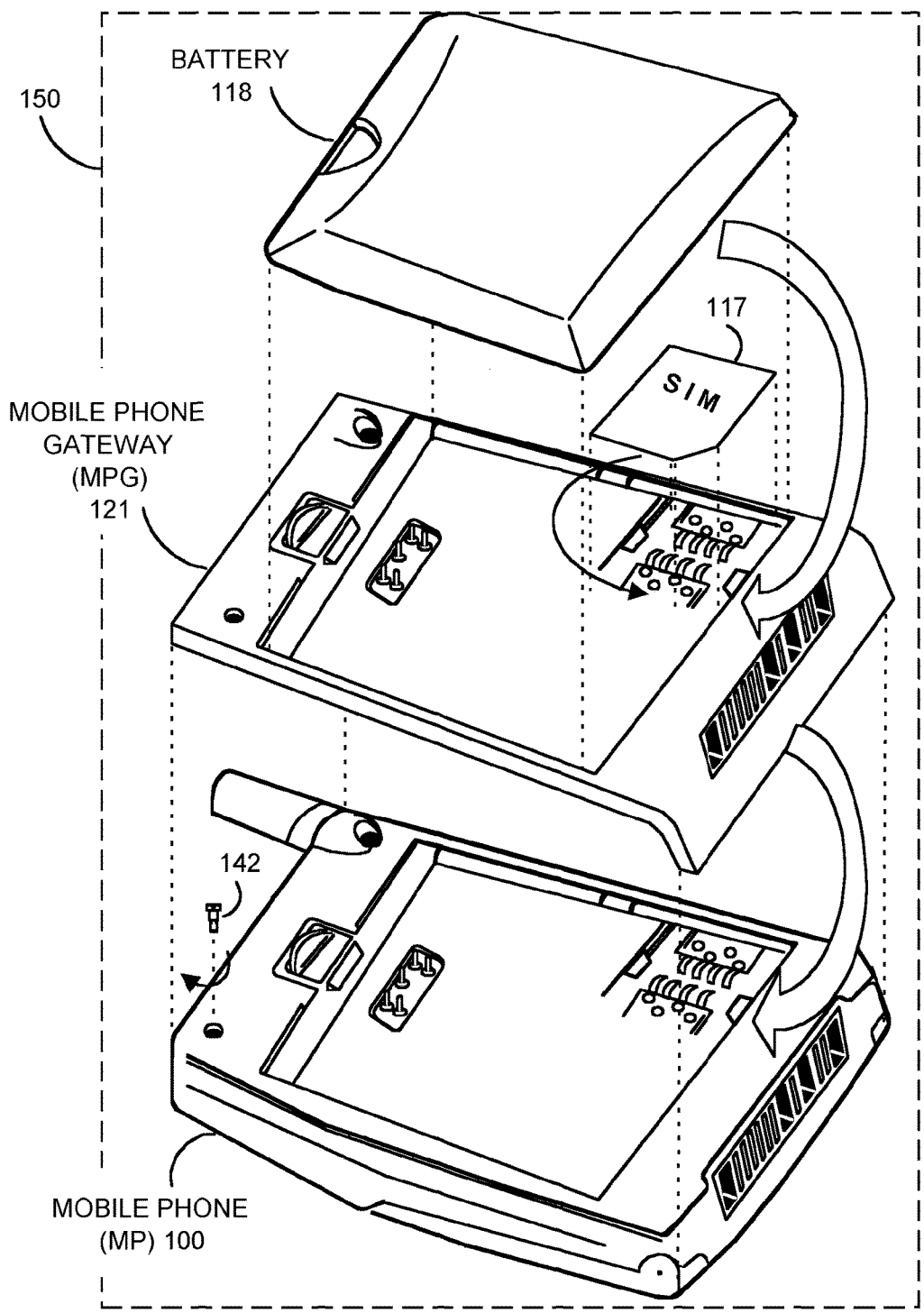
FIG. 3 illustrates a communication system comprising the exemplary MP and MPG.

FIG. 3 shows an embodiment of a communication system 150 comprising the exemplary MP 100 and MPG 121. After removing battery 118 and SIM card 117 from MP 100, screw 142 is screwed into engagement recess 116. Then, MPG 121 is physically attached to MP 100, secured to latching screw 116 using engagement recess 141, and engaged with it through the connectors and sockets described earlier. SIM card 117 and battery 118 are then connected and secured to it. Once MPG 121 has been assembled with MP 100, communication system 150 can be used to invoke and accept calls as will be illustrated in the following.

Figure 4:
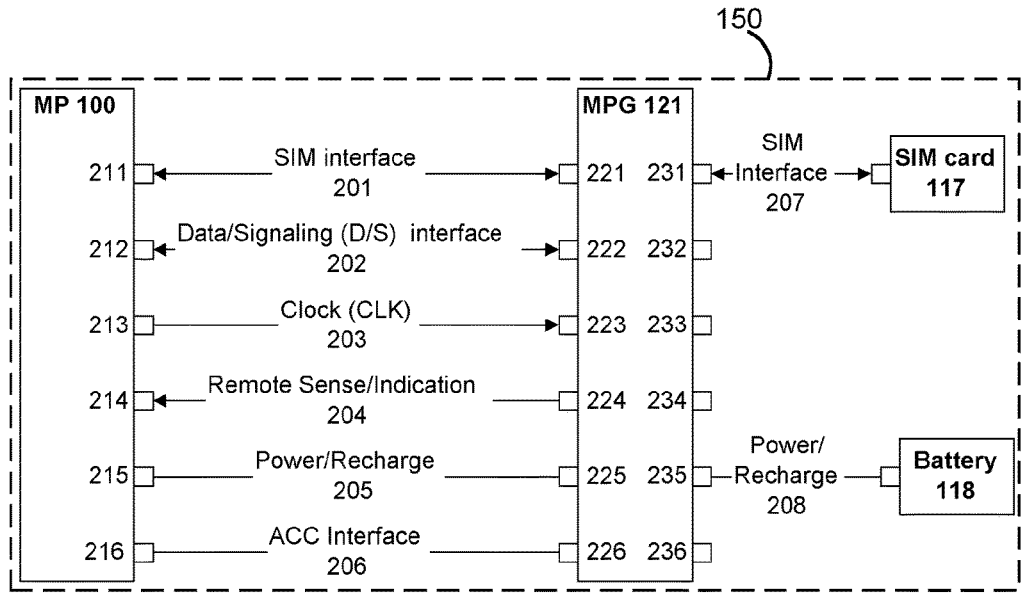
FIG. 4 shows a generalized communication system comprising a MP and an MPG.

FIG. 4 shows a generalized communication system 150 comprising: MP 100; MPG 121; SIM card 117; battery 118; a collection of interfaces between MP 100 and MPG 121, established through a collection of mating interface means; an interface between MPG 121 and SIM card 117, and an interface between MPG 121 and battery 118, established through mating interface means.

SIM Interface 201 is established between MPG 121 and MP 100 for the purpose of taking over SIM card functionality. SIM Interface 207 is established between MPG 121 and the MP's original SIM Card 117. Together, these two interfaces provide the basis for wrapping SIM functionalities by MPG 121.

Preferably, SIM Interface 201 and SIM Interface 207 are identical in terms of the communication protocol applied to them (e.g., ISO 7816). This facilitates a simpler implementation of the wrapping means and methods. They may, however, defer from each other, in which case the wrapping means and methods also take care for adapting communication from one interface to the other.

Data/Signaling (D/S) interface 202 is established between MPG 121 and MP 100 to enforce communication between MP 100 and any network to pass through MPG 121, thus enabling processing and redirecting communication through a different network. Connector 232 enables engaging MPG 121 with another accessory D/S device in the same manner it would when engaged directly with MP 100.

Clock interface 203 is used to obtain the system clock of the MP. This reduces design complexity of MPG 121 and improves synchronization with the MP 100. Typically, MPs provide clock lines as part of their SIM card socket 113 as well as of their accessory device socket 114. Either one or both of these clock lines may be used by MPG 121. Clock lines are relayed by MPG 121 for use by SIM Card 117 and/or accessory devices. This is depicted by abstract connector 233.

Remote Sense/Indication interface 204 is used by accessory devices to signal MP 100 whenever they are plugged to it. When MP 100 is signaled through this interface, it routes communication with the network to pass through D/S interface 202. MPG 121 also features Remote Sense interface means 234 in the same form as Remote Sense interface means 214 of MP 100, so that D/S communication with the network can be further delegated by MPG 121 through another accessory device. Typically, Remote Sense interface means 214 is formed as part of accessory device socket 114 of MP 100.

Power/Recharge interface 205 is used in conjunction with Power interface 208 for powering MP 100 and MPG 121 by battery 118, and for recharging battery 118. In the embodiment depicted in FIG. 2, connector 225 is realized by socket 126, whereas connector 235 is realized by connector 134. Power/recharge socket 126 and connector 134 are physically coupled to enable powering MP 100 from battery 118, as well as powering MPG 121 internally. In addition, MPG 121 relays external power sources plugged through accessory device socket 138 to pass through MP 100, which then recharges battery 118 through connector 110.

Mobile phones come with various types, forms, and arrangements of an accessory device socket. Such differences, however, have no effect on the present invention other than those related to the external design of an MPG for a particular model of MP and the relay of unused contacts in-between the MP's socket 114 and the MPG's socket 138.

ACC Interface 206 enables communication between MP 100 and wireless data terminals (DTs) through MPG 121, in which case MPG 121 interconnects MP 100 with wireless DTs complying with the accessory device interface protocol of MP 100. A communication session may then be established between a wireless DT and either the first or second network, wherein when established with the second network, MPG 121 serves also as a gateway between MP 100 and the second network. Interface means 236 is formed and arranged in the same manner as interface means 216 of MP 100, such that wired DTs can be plugged to MPG 121 and interact through it with MP 100. Typically, mobile phones offer an accessory device interface such as a TA/TE or a USB OTG interface as part of their accessory device socket.

In an embodiment of the present invention, an MPG is provided with both ACC interface means 226 and ACC interface means 236. In yet another embodiment of the present invention, an MPG is provided with only ACC interface means 226. In yet another embodiment of the present invention, an MPG is provided with no ACC interface means. Accordingly, an MPG may be configured either to be coupled with the MP and with accessory devices through an accessory device interface with each one of them, or to be coupled only with the MP through such an accessory device interface, or lack any accessory device interfacing capabilities.

Internally, MPG 121 comprises components for interfacing with a MP, interfacing with the communication networks, and for processing. These components may be broadly classified into four subsystems: data/signaling (D/S) communication subsystem, accessory device interface subsystem, SIM logic subsystem, and processing and control subsystem.

In a typical functional model of a wireless communication device, a signal is received by a transceiver section where it is translated into digital baseband representation and then passed to a digital processing section for further processing. Transmitted signals go through reverse path of processing. Internally, a transceiver may be further subdivided into a analog-to-digital and digital-to-analog (ADC/DAC) section and a signal collection and production sections. The following figures illustrate possible functional models of an MPG in accordance with the functional model of a wireless communication device and the functional requirements from an MPG as stated throughout the present invention. Other functional models with equivalent advantage may be provided by a person skilled in the art without departing from the spirit and scope of the present invention in its broadest form.

In the following, communication lines between devices and in-between elements within a device are discussed and presented in logical rather than physical manners, ignoring properties which are irrelevant to the description, such as allocation of a communication line into wires or striplines, functionality of each wire/stripline, and physical coupling of a wire/stripline to an element/device.

Figure 5:
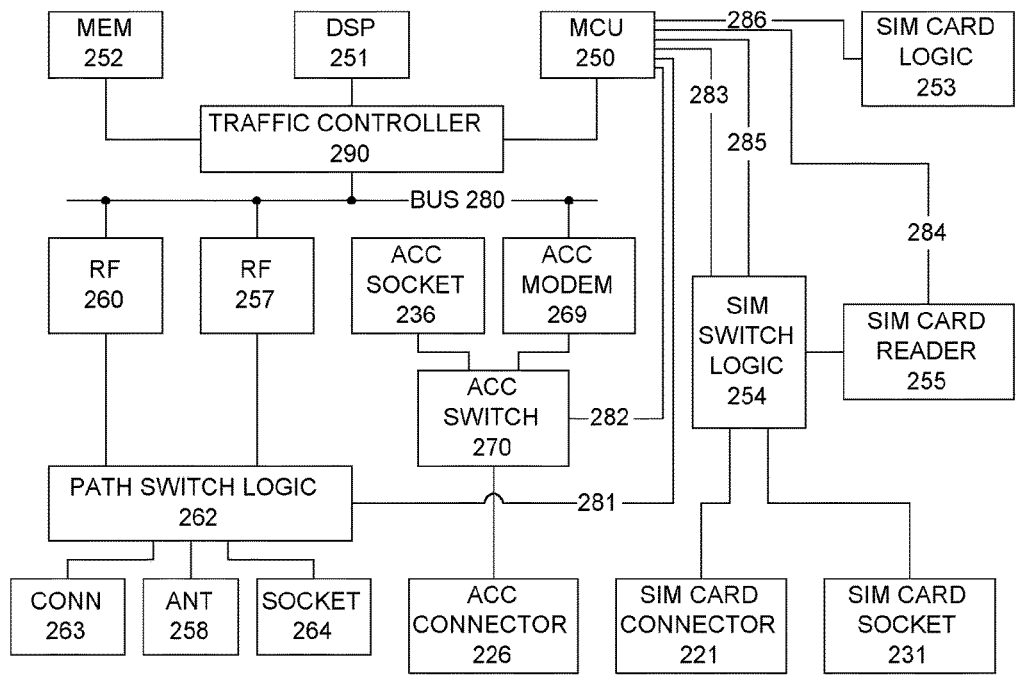
FIG. 5 shows a block structure of an MPG configured for r.f.-form data/signaling (D/S) interface with the MP.

FIG. 5 is a block structure of an MPG configured for use with a MP having an r.f.-form D/S interface. Consequently, the D/S communication subsystem of MPG comprises: connector 263, further comprising an r.f. connector realizing abstract D/S interface means 222; first transceiver 260 configured for use in accordance with at least the first protocol (the protocol of the MP); second transceiver 257 configured for use in accordance with at least the second protocol (the protocol of the network facilitated by the MPG); antenna circuitry 258 configured for use in at least the second network; socket 264, further comprising an r.f. socket realizing abstract D/S interface means 232; and path-switch logic 262 controlled by microcontroller (MCU) 250 and used for routing a communication path to pass in various ways. A detailed description of the switching states is provided in FIG. 8, in its description, and in the claims.

The actual implementation of transceiver 260 may depend on the type and characteristics of the transmission medium between MP and MPG, the characteristics of the signal, and the characteristics of the first protocol. In an embodiment of the present invention, transceiver 260 is optimized for signaling over a short-distance coaxial line in accordance with the first protocol.

In an embodiment of the present invention, transceivers 257 and 260 are distinct. In yet another embodiment of the present invention, transceivers 257 and 260 are integrated. Other designs of these functional modules may be provided by a person skilled in the art without departing from the spirit and scope of the present invention in its broadest form.

The accessory device interface subsystem comprises: communication means ACC COMM 269 for communicating through an accessory device interface; ACC connector 226, and ACC socket. ACC COMM 269 is a protocol-dependent component such as a modem, a bus communication interface, a bus coupler, or a bus adapter. ACC COMM 269 implements at least the physical layer of the communication protocol of the accessory device interface. ACC switch logic 270 facilitates switching communication conducted through the accessory device interfaces. An ACC switch may be suitable in certain configurations of MPG such as a configuration wherein the communication protocol of ACC interface 206 is a point-to-point protocol such as TA/TE. An ACC switch logic 270 may then be used to switch between: first state, wherein ACC connector 226 is switched to ACC socket 236, thus practically bypassing ACC COMM 269; second state, wherein ACC connector 226 is switched to ACC COMM 269, thus effectively engaging MPG with the MP through ACC interface 206. In the embodiment presented in this figure, an electrically-controlled ACC switch is provided. In yet another embodiment of the present invention, a mechanically-controlled ACC switch such as a pressure-sensitive switch coupled with or embedded within ACC socket 236, provides similar functionality. In yet another embodiment of the present invention, no ACC socket 236 is provided and hence, no ACC switch is required either. In other configurations, such as where the accessory device communication interface is a bus such as USB or USB OTG, communication path control over the accessory device interface may be provided in other ways such as: by a mixed hardware-software control logic; provided by ACC COMM 269 as part of its implementation to the protocol; or even discarded altogether. In such embodiments of the present invention, other accessory devices may communicate simultaneously with the MP through MPG.

In the embodiment of MPG as illustrated in this figure, the SIM logic subsystem comprises: SIM card logic 253 implementing SIM functionalities for the second network; SIM card connector 221 with which MPG connects to SIM card socket 211 of MP 100; SIM card socket 231 into which SIM card 117 is connected; SIM card reader 255 used for accessing SIM card 117 by MPG; and SIM switch 254 controlled by MCU 250. When SIM card connector 221 is switched to SIM card socket 231, MPG is effectively bypassed, and the MP communicates directly with SIM card 117. When, however, SIM card connector 221 is switched to MCU 250 and SIM card reader 255 is switched to SIM card socket 231, MPG effectively engages into the SIM communication path of the MP, and thus, is able to process SIM requests and events. In particular, call control events are intercepted and processed by MPG to decide through which network a call should be routed, and hence, which SIM card logic to use. Other features of this design include; embellishing the user interface of the MP with menus, menu items, menu selection events handling, and audiovisual effects issued by MPG so as to enable controlling MPG behavior by the user; and access to the authentication and ciphering keys produced by SIM card 117.

In the embodiment of MPG as illustrated here, SIM Card Reader 255 is used for communicating with SIM card 117. In yet another embodiment of MPG which is not configured for coupling with an external SIM card, no SIM card reader is required. In an embodiment of MPG which is configured for coupling with more than one external SIM card, SIM Card Reader 255 may be used for communicating with all of them by signaling SIM Switch Logic 254 to switch to the appropriate SIM card socket. Alternatively, MPG may comprise more than one SIM card reader, each one assigned to a different SIM card socket.

The processing and control subsystem comprises: microcontroller (MCU) 250 used for controlling and managing activities in MPG; digital signal processor (DSP) 251; and a memory module (MEM) 252. Note, however, that some or all of these components, as well as components of the other subsystems, may be implemented within a single Application Specific Integrated Chip (ASIC), or in multiple chips.

As in conventional designs of integrated circuits for wireless devices, a bus 280 is used in conjunction with Traffic Controller 290 for the communication between system components. Control line 281 is used for controlling path-switch logic 262, control line 282 is used for controlling ACC switch logic 270, and control line 283 is used for controlling SIM switch logic 254. Data line 284 is used for communication between MCU 250 and SIM card 117 through SIM Card Reader 255 and SIM card socket 231, whereas data line 285 is used for communication between MCU 250 and MP 100 through SIM card connector 221. Data line 286 is used for communication between MCU 250 and SIM card logic 253.

Figure 6:
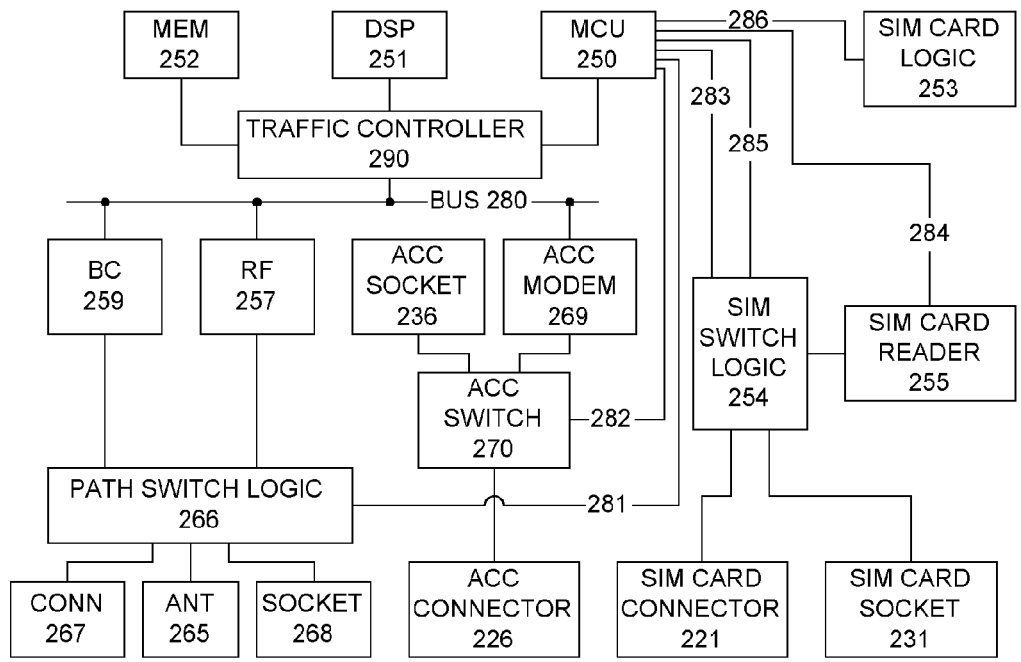
FIG. 6 shows a block structure of an MPG configured for digital baseband-form D/S interface with the MP.

FIG. 6 is a block structure of an MPG configured for use with a MP having a digital baseband form D/S interface. In this configuration, D/S connector 267 and socket 268 are designed for digital baseband signaling, bus coupler BC 259 couples the digital baseband interface of MP with the digital processing subsystem of MPG in an equivalent manner to the coupling of the digital processing subsystem and the transceiver internally within the MP, and antenna circuitry 265 is configured for use on at least the second network. Path-switch logic 266 is properly designed for this configuration as further explored in FIG. 9. All other components in this configuration are equivalent to those depicted in FIG. 5.

Figure 7:
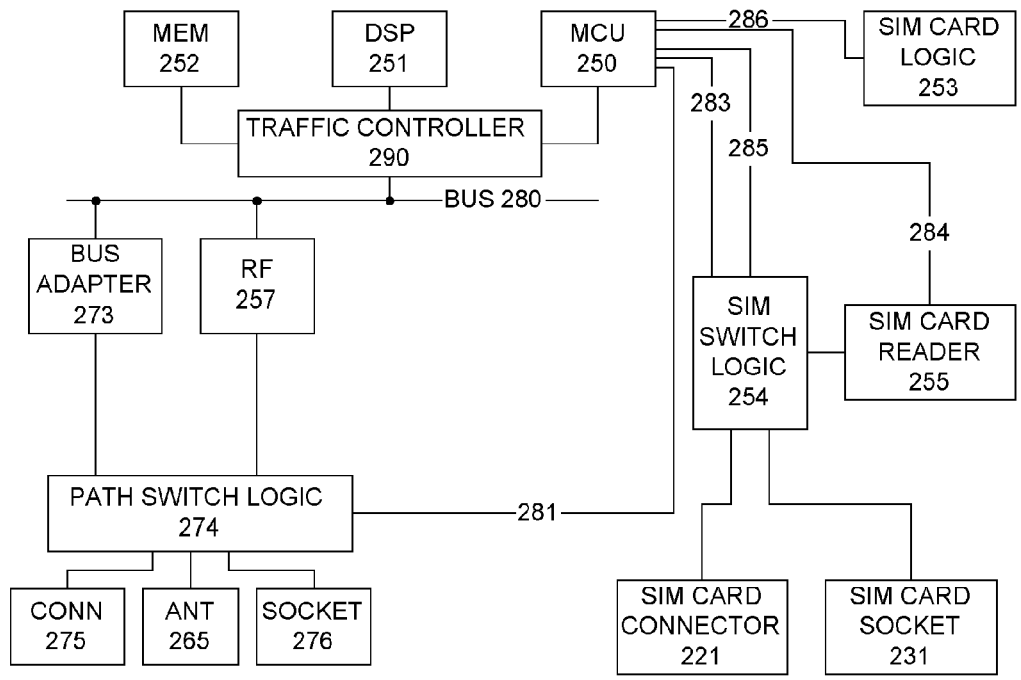
FIG. 7 shows a block structure of an MPG configured for digital-form D/S interface with the MP.

FIG. 7 is a block structure of an MPG configured for use with a MP having a digital-form D/S interface. In this configuration, D/S connector 275 and socket 276 are designed for digital signaling, signaling on the D/S interface 202 is handled by bus adapter logic 273, and antenna circuitry 265 is configured for use on at least the second network. Bus adapter 273 mediates between the interface bus of the MP and the internal bus 280 of MPG. Path-switch logic 274 is properly designed for this configuration as further explored in FIG. 10.

In an embodiment of the present invention wherein the interface bus of the MP and the internal bus 280 are capable of direct coupling, bus adapter 273 may reduce to a bus coupler.

In the embodiment of MPG as presented in FIG. 7, communication related to D/S interface 202 and communication related to ACC interface 206 are conducted through the same communication means (represented here by connector 275, socket 276, and bus adapter 273), thus there is no need for a distinct accessory device interface subsystem. For example, USB OTG communication means may be used to establish a plurality of communication links, some of which carrying network-related data/signaling content, whereas the others carrying accessory device-related content. As indicated earlier, control over accessory device-related communication links may be provided in different ways, such as by a control logic, or even discarded altogether.

The system configurations relating to FIGS. 5, 6, and 7, as described above, use bus topology for internal communication between system elements. Other means and/or topologies for internal communication (such as star or point-to-point), may be provided with equivalent advantage by a person skilled in the art, without departing from the scope and spirit of the present invention in its broadest form.

The behavior of MPG may be described using a state machine. In the present description, the MPG implements a state machine comprising the following states: OFF—wherein only features related to handling menu events issued through SIM interface 201 are active; RELAY—wherein MPG waits for the end of a communication session established between MP 100 and the first network; ACTIVE—wherein MPG routes and processes packets exchanged between MP 100 and stations and DTs of the second network; SLEEP—wherein MPG listens to the paging channel of the second network less frequently; and SUSPEND—wherein MPG waits for channels to become free. A more comprehensive description of the state machine is provided in FIG. 26 and the related description.

In addition, MPG defines first network-context, wherein MPG is set such that MP 100 can communicate with the first network; and second network-context, wherein MPG is set such that MP 100 communicates with the second network through MPG.

In an MPG not configured to communicate or relay communication with the first network, switching to first network-context comprises: properly setting the path-switch (266, 274); breaking communication links with the second network; and powering down unnecessary hardware elements. From this point, MPG relays SIM requests issued by MP 100 to SIM card 117. Events and requests issued by the MP on SIM interface 201 indicate when the communication session ends. Accordingly, switching to second network-context comprises: powering up hardware elements required for operation as a gateway and call routing device; properly setting the path-switch; and establishing a control communication link with the second network. From this point, MPG intercepts and processes SIM requests issued by MP 100 through SIM interface 201.

Path-switch logics (262, 266, 274) control the communication paths established between MP 100, MPG 121, and first and second networks. A path-switch logic comprises switching means and interface means, wherein the interface means comprises D/S interface means (222, 232), and remote sense/indication interface means (224, 234). The switching means is best described using a state table specifying: the source ("From"), the target ("To"), whether an external D/S interface means is engaged to MPG, the current network-context, the input component to the D/S subsystem, the output component from the D/S subsystem, the state of MPG, and a switching map between input/output lines to which the path-switch is connected.

In the following descriptions of FIG. 8-10, we shall relate to an electromechanical remote sense/indication interface. In an embodiment of the present invention wherein MP 100 is equipped with only mechanical remote sense/indication interface means, when MPG 121 is coupled with MP 100, communication paths established between MP 100 and any network are constantly routed through MPG 121, implying that MPG has to be equipped with means for communicating with or relaying communication to the first network.

An example of a mechanical remote sense/indication interface means is where a MP comprises an r.f. socket through which an external antenna may be coupled with it, wherein the r.f. socket is designed to physically decouple the MP's antenna from its transceiver when an r.f. connector is plugged into it, and couple the MP's transceiver with the external device to which the r.f. connector is coupled. An MPG may then be configured to accommodate such a design with appropriate means for detecting when its r.f. connector is plugged into or unplugged from the r.f. socket of the MP. In such case, the path switch logic as disclosed hereinafter may be adapted to reflect the substitution of an electrical remote sense/indication line with a static sensing means, or, alternatively ignore remote sense/indication altogether.

Another form by which a remote sense/indication mechanism may be implemented is by way of messaging, wherein an event notification or a message is sent by a coupled device to the device with which it couples, instructing it to redirect data/signaling through a specific interface or interface means. In an embodiment of the present invention, remote sense/indication messaging is provided through the SIM interface. In yet another embodiment of the present invention, remote sense/indication messaging is provided through the data/signaling interface. In yet another embodiment of the present invention, remote sense/indication messaging is provided through the accessory device interface.

We shall also assume that if a communication means is coupled with MPG through the second D/S and remote sense/indication interface means (264, 268, 276), then it is operative in accordance with both first and second protocols and networks. The more restricted form wherein a coupled communication means is operative only on the first network requires minor modifications to be made to the state table of the path-switch logic.

Figure 8:
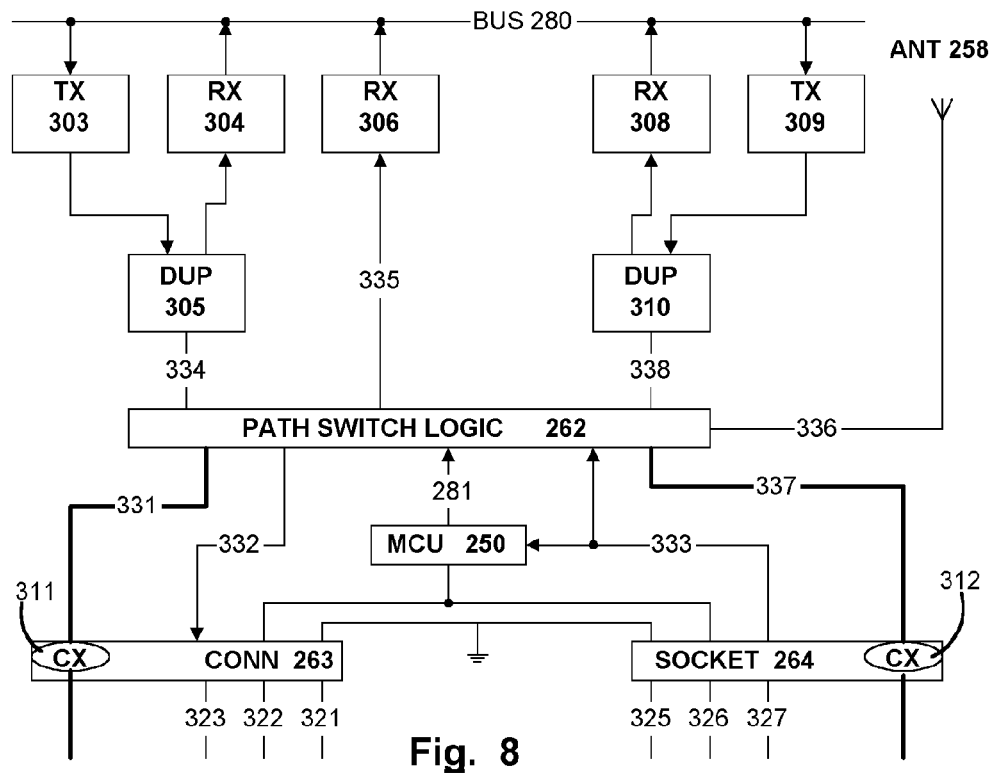
FIG. 8 shows a path-switching logic of an MPG configured for r.f.-form D/S interface with the MP.

FIG. 8 schematically illustrates an MPG with path-switch 262 configured for an r.f.-form D/S interface with the MP. The following description relates to transceivers (257, 260) having a duplexer, such as transceivers compliant with CDMA protocol. For time-division protocols such as GSM, a two-way switch replaces the duplexer such that at any time, either the receiver or the transmitter is connected to the input/output line.

In this configuration, connector 263 using which MPG communicates with MP 100 comprises: r.f. connector 311; remote indication pin 323; external power pin 322; and common ground pin 321. Socket 264 using which MPG communicates through an external communication means comprises: r.f. socket 312; remote sense contact 327; external power 326 and common ground 325 contacts.

The input/output lines to/from path-switch 262 are: r.f. signaling line 331; remote indication line 332; r.f. signaling line 337; remote sense line 333; line 334 to duplexer 305 of transceiver 260; line 338 to duplexer 310 of transceiver 257; and line 336 to antenna circuitry 258. In addition, line 281 is used for controlling switch state, and line 335 connects to receiver 306, such that when in ACTIVE state, MPG can still listen to paging requests on the first network while processing communication sessions established between MP 100 and the second network.

Table 1 explores the possible states of path-switch 262.

TABLE 1

| From | To | Ext. Ant. | Network Context | In | Out | MPG 121 | Switch Line 331 | Switch Line 332 | Switch Line 338 | Switch Line 335 |
|---|---|---|---|---|---|---|---|---|---|---|
| N/A | | Any | First | 263 | 264 | OFF | 337 | 333 | 336 | N/A |
| N/A | | No | First | 263 | 264 | READY | 336 | +V | 336 | N/A |
| N/A | | Yes | First | 264 | 263 | READY | 337 | 333 | 337 | N/A |
| MP | NET | No | First | 263 | 258 | RELAY | 336 | +V | 336 | N/A |
| MP | NET | Yes | First | 263 | 264 | RELAY | 337 | 333 | 337 | N/A |
| NET | MP | No | First | 264 | 263 | RELAY | 336 | +V | 336 | N/A |
| NET | MP | Yes | First | 264 | 263 | RELAY | 337 | 333 | 337 | N/A |
| MPG | MP | Any | First | N/A | N/A | N/A | | | | |
| MPG | NET | Any | First | N/A | N/A | N/A | | | | |
| MPG | MP | No | Second | 303 | 263 | ACTIVE | 334 | +V | 336 | 336 |
| MPG | MP | Yes | Second | 303 | 263 | ACTIVE | 334 | +V | 337 | 337 |

TABLE 1-continued

| From | To | Ext. Ant. | Network Context | In | Out | MPG 121 | Switch Line 331 | Switch Line 332 | Switch Line 338 | Switch Line 335 |
|---|---|---|---|---|---|---|---|---|---|---|
| MP | NET | No | Second | 263 | 304 | ACTIVE | 334 | +V | 336 | 336 |
| MP | NET | Yes | Second | 263 | 304 | ACTIVE | 334 | +V | 337 | 337 |
| MPG | NET | No | Second | 309 | 258 | ACTIVE | 334 | +V | 336 | 336 |
| MPG | NET | Yes | Second | 309 | 264 | ACTIVE | 334 | +V | 337 | 337 |
| NET | MPG | No | Second | 258 | 308 | ACTIVE | 334 | +V | 336 | 336 |
| NET | MPG | Yes | Second | 264 | 308 | ACTIVE | 334 | +V | 337 | 337 | wherein: N/A is an abbreviation for Not Applicable; MP relates to MP 100; MPG relates to MPG 121; NET is an abbreviation for either first or second network, depending on the network context; and the symbol+V indicates positive signal or power.

Referring to Table 1, when in OFF state, signaling through r.f. line 331 is effectively switched to signaling through r.f. line 337, and no remote indication signal is issued by MPG. When in READY state and no external r.f. accessory device is connected, antenna 258 serves MP 100 for listening to first network while serving MPG for listening to second network. This feature enables instant switching from first to second network-context, and is useful in case MP 100 re-registers with the network whenever remote indication interface 204 changes state. When in READY state and an external r.f. accessory device is connected, this external device serves both MP 100 and MPG for communicating with the first and the second networks, respectively. When in ACTIVE state, signaling through r.f. line 331 is effectively switched to signaling through line 334 and through it to receiver 304 and transmitter 303, while receiver 308 and transmitter 309 are effectively switched to antenna 258 if no external r.f. accessory device is connected, or to r.f. socket 312 otherwise. When in this state, remote indication line 332 is turned on.

In the design illustrated here, receiver 306 is in conformance with at least the first network and fed by data/signaling from either ANT 258 or socket 312, such that when in ACTIVE state, MPG may still listen to control channels of the first network. Other design possibilities regarding this feature include: integrate receivers 304 and 306 in such manner that facilitates listening to the signals coming from both lines 334 and 335, or from duplexer 305 and line 335, by a single receiver; replace receiver 306 by an r.f. mixer which feeds receiver 304 by a mixed signal from lines 334 and 335, or from duplexer 305 and line 335. In either one of the above designs, MPG may still listen to control channels of the first network, such as paging and beacon channels. This facilitates alerting on incoming calls from the first network while communicating through the second network. It also facilitates keeping the MP up-to-date with the properties of the first network while it effectively communicates through the second network.

Figure 9:
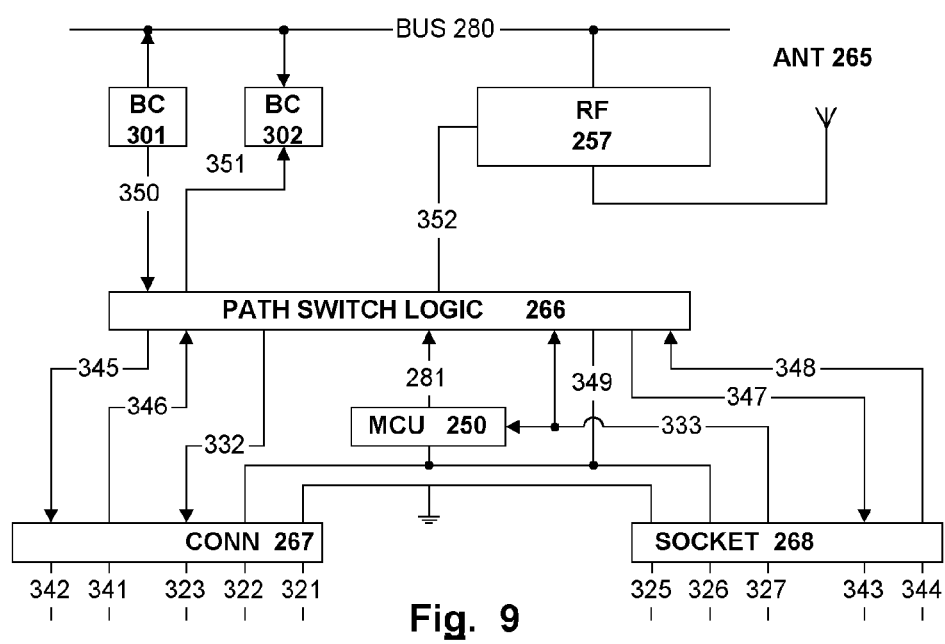
FIG. 9 shows a path-switching logic of an MPG configured for baseband-form D/S interface with the MP.

FIG. 9 schematically illustrates an MPG 121 with path-switch 266 configured for a baseband-form D/S interface to the MP.

In the configuration illustrated here, it is assumed that the digital baseband D/S interface means of MP 100 comprises an input line and an output line. Subsequently, MPG comprises bus couplers 301 and 302 for coupling the output and input lines, respectively, with internal bus 280. Other configurations of a baseband D/S interface means, such as a single line or a bus may be treated in a similar manner with equal advantage.

In this configuration, connector 267 using which MPG communicates with MP 100 comprises: baseband input 341 and output 342 pins; remote indication pin 323; external power pin 322; and common ground pin 321. Socket 268 using which MPG communicates through an external communication means comprises: baseband input 344 and output 343 contacts; remote sense contact 327; external power 326 and common ground 325 contacts.

The input/output lines to/from path-switch 266 are: baseband input 346 and output 345 lines; remote indication line 332; baseband input 348 and output 347 lines; remote sense line 333; power line 349; baseband input 350 and output 351 lines; and power line 352.

Table 2 explores the possible states of path-switch 266.

Referring to Table 2, when in OFF or RELAY state, signaling through baseband lines 345 and 346 are effectively switched to signaling through baseband lines 348 and 347, respectively, and signaling through remote indication line 332 is effectively switched to signaling through remote sense line 333, thus MPG is effectively bypassed. The difference between OFF or RELAY states and READY state is that when in READY state, transceiver 257 of the second network is powered on via power line 352, so that MPG can communicate with the second network. When in ACTIVE state and no external transceiver is connected through socket 268, signaling through baseband lines 345, 346 are effectively switched to signaling through baseband lines 350, 351, respectively, signaling through remote indication line 332 is effectively turned on, and transceiver 257 is powered on via power line 352, thus generating a path between MP 100 and the second network through MPG. If, however, an external transceiver is connected through socket 268, transceiver 257 is powered down and communication with the second network passes through socket 268.

TABLE 2

| From | To | Ext. RF | Network Context | In | Out | MPG 121 | Switch Line 345 | Switch Line 346 | Switch Line 332 | Switch Line 352 |
|---|---|---|---|---|---|---|---|---|---|---|
| N/A |  | Any | First | 267 | 268 | OFF | 348 | 347 | 333 | 0 |
| N/A |  | No | First | 268 | 267 | READY | 348 | 347 | 333 | +V |
| N/A |  | Yes | First | 268 | 267 | READY | 348 | 347 | 333 | +V |
| MP | NET | No | First | N/A | N/A | RELAY | 348 | 347 | 333 | 0 |

TABLE 2-continued

| From | To | Ext. RF | Network Context | In | Out | MPG 121 | Switch Line 345 | Switch Line 346 | Switch Line 332 | Switch Line 352 |
|---|---|---|---|---|---|---|---|---|---|---|
| MP | NET | Yes | First | 267 | 268 | RELAY | 348 | 347 | 333 | 0 |
| NET | MP | No | First | N/A | N/A | RELAY | 348 | 347 | 333 | 0 |
| NET | MP | Yes | First | 268 | 267 | RELAY | 348 | 347 | 333 | 0 |
| MPG | MP | Any | First | N/A | N/A | N/A | | | | |
| MPG | NET | Any | First | N/A | N/A | N/A | | | | |
| MPG | MP | No | Second | 301 | 267 | ACTIVE | 350 | 351 | +V | +V |
| MPG | MP | Yes | Second | 301 | 267 | ACTIVE | 350 | 351 | +V | +V |
| MP | NET | No | Second | 267 | 302 | ACTIVE | 350 | 351 | +V | +V |
| MP | NET | Yes | Second | 267 | 302 | ACTIVE | 350 | 351 | +V | +V |
| MPG | NET | No | Second | 257 | 265 | ACTIVE | 350 | 351 | +V | +V |
| MPG | NET | Yes | Second | 257 | 268 | ACTIVE | 350 | 351 | +V | 0 |
| NET | MPG | No | Second | 265 | 257 | ACTIVE | 350 | 351 | +V | +V |
| NET | MPG | Yes | Second | 268 | 257 | ACTIVE | 350 | 351 | +V | 0 |

Figure 10:
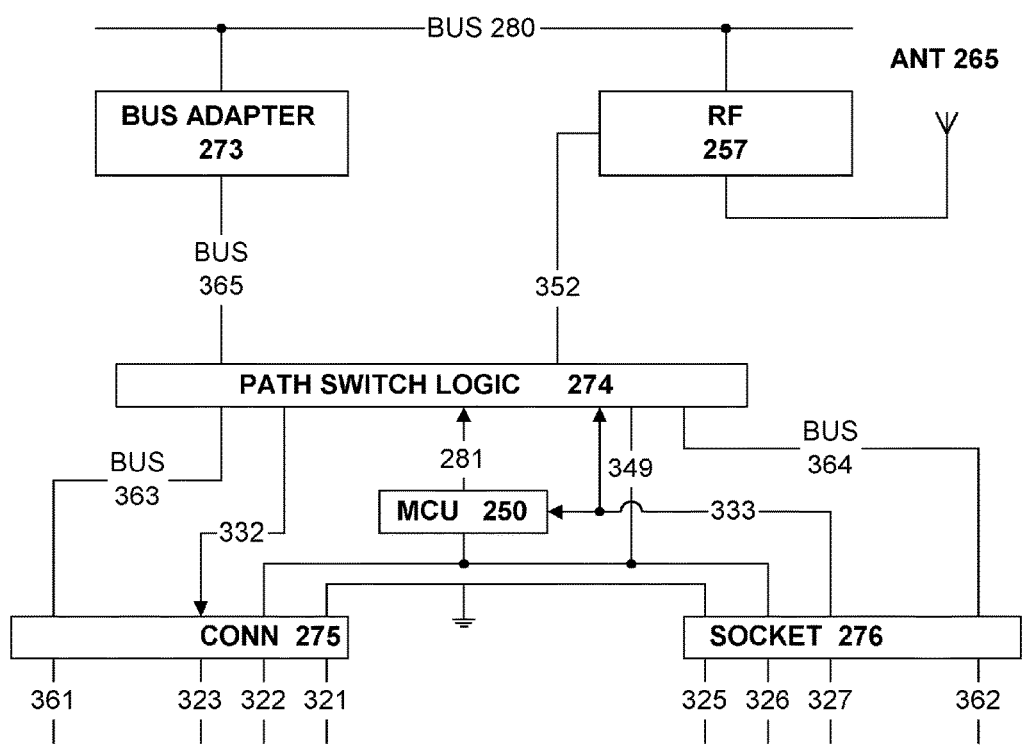
FIG. 10 shows a path-switching logic of an MPG configured for digital-form D/S interface with the MP.

FIG. 10 schematically illustrates an MPG 121 with path-switch 274 configured for a digital-form D/S interface with the MP.

In this configuration, connector 275 using which MPG communicates with MP 100 comprises: bus connector 361 formed to obtain mechanical, structural, and electrical compatibility with the digital bus of MP 100; remote indication pin 323; external power pin 322; and common ground pin 321. Socket 276 using which MPG communicates with accessory devices comprises: bus socket 362 conforming to the same specifications as the bus socket of MP 100; remote sense contact 327; external power 326 and common ground 325 contacts.

The input/output lines to/from path-switch 274 are: bus 363; remote indication line 332; bus 364; remote sense line 333; power line 349; bus 365; and power line 352.

For the purpose of the discussion here, it is assumed that only network-related data/signaling links are established through the D/S interface. State tables relating to configurations of an MPG wherein accessory device-related links are established through the same digital communication means as the data/signaling links may be derived in similar manner, possibly adding to the state table some switching states and columns which specify how D/S links and accessory device interface links are handled in mixed situations.

Table 3 explores the possible states of path-switch 274.

Referring to Table 3, when in OFF or RELAY state, signaling through bus 363 is effectively switched to signaling through bus 364, and signaling through remote indication line 332 is effectively switched to signaling through remote sense line 333, thus MPG is effectively bypassed. The difference between OFF or RELAY states and READY state is that when in READY state, transceiver 257 of the second network is powered on via power line 352, so that MPG can communicate with the second network. When in ACTIVE state and no external digital processing device is connected through socket 276, signaling through bus 363 is effectively switched to signaling through bus 365, signaling through remote indication line 332 is effectively turned on, and transceiver 257 is powered on via power line 352, thus generating a path between MP 100 and the second network through MPG 121. If, however, an external digital processing device is connected through socket 276, transceiver 257 is powered down and communication with the second network passes through socket 276.

It is understood that path-switch logics 262, 266, and 274 may implement the switching using various means and methods, such as: micro-electromechanical switches; electrical switching means such as diode-based switches; hybrid circuits for splitting and switching of r.f. signals transmitted through r.f. transmission lines.

The description in FIG. 8-10 relates to configurations of MPG wherein remote sense/indication are provided electri-

TABLE 3

| From | To | Ext. Baseband | Network Context | In | Out | MPG 121 | Switch Line 363 | Switch Line 332 | Switch Line 352 |
|---|---|---|---|---|---|---|---|---|---|
| N/A | | Any | First | 275 | 276 | OFF | 364 | 333 | 0 |
| N/A | | No | First | 275 | 276 | READY | 364 | 333 | +V |
| N/A | | Yes | First | 276 | 275 | READY | 364 | 333 | +V |
| MP | NET | No | First | N/A | N/A | RELAY | 364 | 333 | 0 |
| MP | NET | Yes | First | 275 | 276 | RELAY | 364 | 333 | 0 |
| NET | MP | No | First | N/A | N/A | RELAY | 364 | 333 | 0 |
| NET | MP | Yes | First | 276 | 275 | RELAY | 364 | 333 | 0 |
| MPG | MP | Any | First | N/A | N/A | N/A | | | |
| MPG | NET | Any | First | N/A | N/A | N/A | | | |
| MPG | MP | No | Second | 273 | 275 | ACTIVE | 365 | +V | +V |
| MPG | MP | Yes | Second | 273 | 275 | ACTIVE | 365 | +V | +V |
| MP | NET | No | Second | 275 | 273 | ACTIVE | 365 | +V | +V |
| MP | NET | Yes | Second | 275 | 273 | ACTIVE | 365 | +V | +V |
| MPG | NET | No | Second | 257 | 265 | ACTIVE | 365 | +V | +V |
| MPG | NET | Yes | Second | 257 | 276 | ACTIVE | 365 | +V | 0 |
| NET | MPG | No | Second | 265 | 257 | ACTIVE | 365 | +V | +V |
| NET | MPG | Yes | Second | 276 | 257 | ACTIVE | 365 | +V | 0 | cally. State tables relating to other possibilities of remote sense/indication such as mechanical or by messaging, may be provided in similar manner, such as by replacing the remote sense/indication lines and power levels with logical indicators.

Once the issue of path switching has been resolved, we may turn to the issue of controlling and managing the call setup phase. Two key functions carried out during a call setup phase are authentication and ciphering. Authentication prevents unauthorized equipment from connecting to the network. A MP will not even register with the network unless a SIM card is plugged into it and authentication has succeeded. Ciphering prevents unauthorized equipment from encrypting data exchanged between the MP and the network. In third generation protocols like UMTS, ciphering is extended to the control data portion of packets, thereby preventing routing of calls through unauthorized networks. Consequently, for a successful communication through the second network, MPG has to take over SIM responsibilities.

The following description relates to call initiation phase wherein the MP supports call control services (GSM SIM service no. 28) on its SIM interface. This, however, should not be regarded as a limitation of the present invention to the particular type of devices and protocols, but rather as a demonstration as to how the present invention may be applied in cases where the mobile phone handles call control in cooperation with its SIM card.

Furthermore, the same principles and methods are applicable to the initiation of any communication session established between the MP and the network, such as data communication, Internet browsing, short message services (SMS) and multimedia message services (MMS).

A MP supporting call control services delegates call initiation control to the SIM card. Also, when the MP receives a call, it interacts with the SIM card for authentication, approval, and initiation notification. Being placed in-between the MP and its SIM card, MPG is able to intercept these interactions and alter their processing such that when appropriate, communication will be passing through the second network. FIGS. 11-14 are interaction diagrams describing the four major scenarios of a call initiation phase in an embodiment of the present invention where the first network is GSM and the second network is Bluetooth. In all these diagrams, unless specified otherwise, it is assumed that MPG is in READY state.

Figure 11:
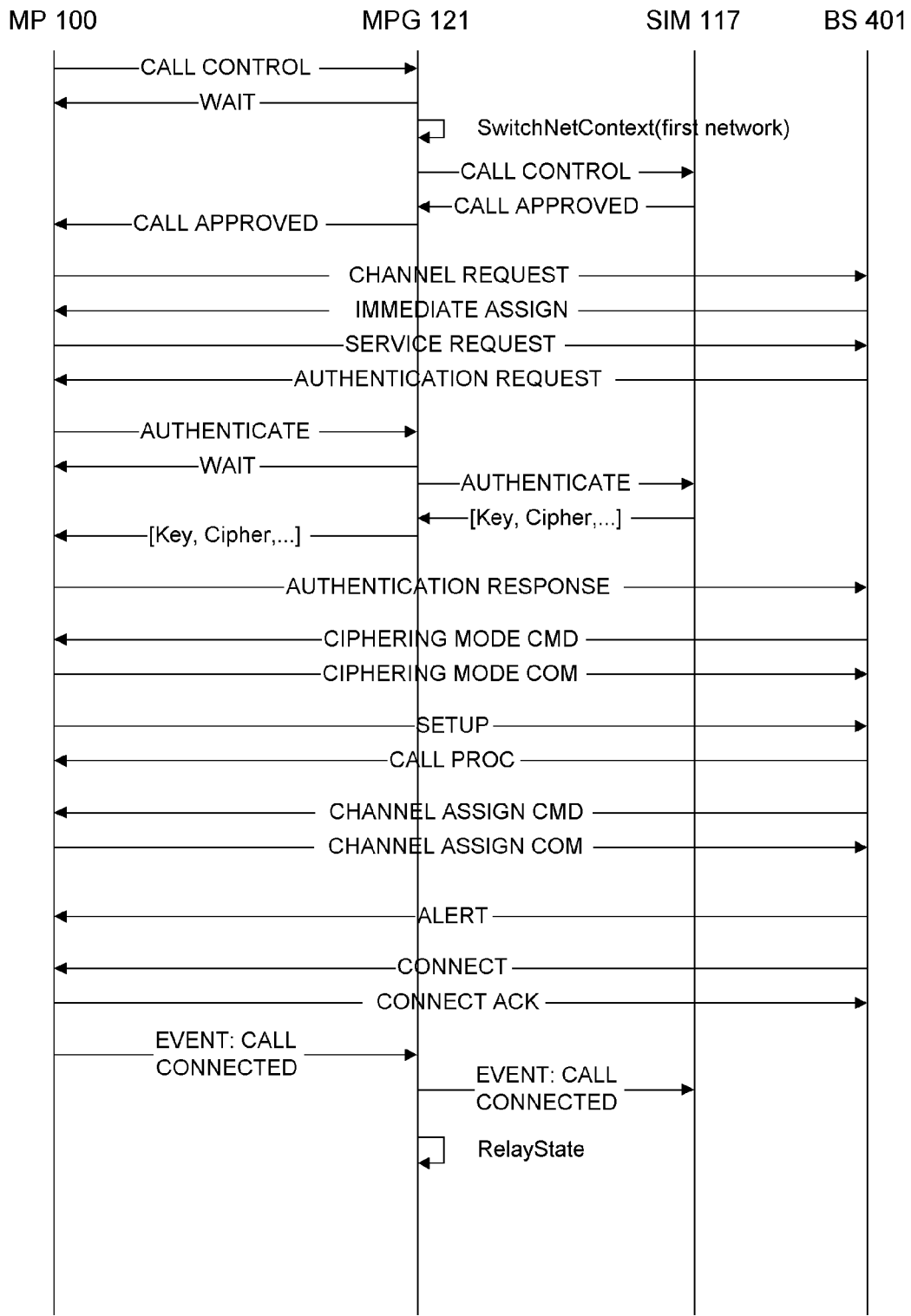
FIG. 11 is an interaction diagram illustrating mobile-originated call initiation for a GSM SIM-compatible MP, where the call is routed through the first network.

FIG. 11 is an interaction diagram of a mobile-originated call initiation phase, wherein the call is routed through the first network. This scenario begins with a CALL CONTROL request issued by MP 100 through SIM interface 201. This message is intercepted by MPG and examined based on user preferences, MPG's setup, and availability of a communication link with the second network. Assuming MPG has concluded that the call should be routed through the first network, it switches to the first network-context.

While processing requests, events, and responses, MPG may send WAIT messages to MP 100. This technique may be used in all call initiation scenarios in order to avoid timeout failure as a result of processing delay introduced by MPG.

At this point, MP 100 conducts a call initiation phase with base station (BS) 401 of the first network. This process comprises: control channel request and assignment; authentication; ciphering mode setting; passing call request data; traffic channel assignment; and alert and connect messages. Once MP 100 has acknowledged connection, it sends a CALL CONNECTED event to its SIM card. When MPG intercepts this event, it enters a RELAY state, wherein it waits for a CALL COMPLETED event to be issued by MP 100 through SIM interface 201.

Figure 12:
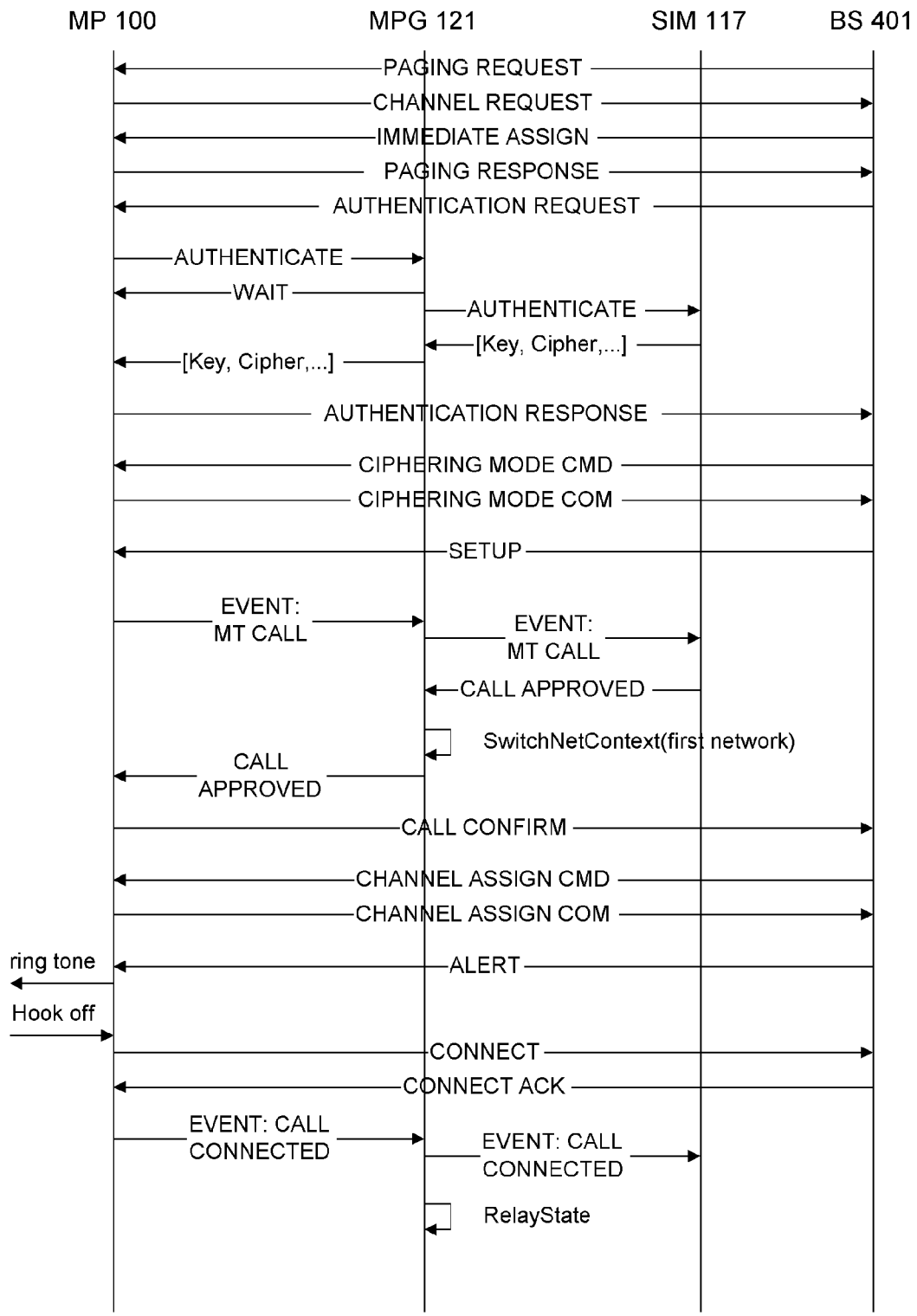
FIG. 12 is an interaction diagram illustrating mobile-terminated call initiation for a GSM SIM-compatible MP, where the call is issued by the first network.

FIG. 12 is an interaction diagram of a mobile-terminated call initiation phase, wherein the call is issued by the first network. This scenario begins with a PAGING REQUEST message issued by BS 401. According to GSM protocol, after assigning a control channel, the MP is requested to authenticate itself. An AUTHENTICATE request is then issued by MP 100 through SIM interface 201. MPG intercepts this request, but since no prior authentication request was issued by it to MP 100 through either the D/S interface 202 or the ACC interface 206, it delegates the request to the MP's SIM card 117. After authenticating and receiving the call request, MP 100 issues a MT CALL event through SIM interface 201 to get approval of the call. MPG intercepts this event and, after delegating it to SIM card 117, switches to the first network-context. Once call initiation has completed successfully, MP 100 sends a CALL CONNECTED event through SIM interface 201. At this point, MPG enters the RELAY state, wherein it waits for a CALL COMPLETED event to be issued on SIM interface 201.

Figure 13:
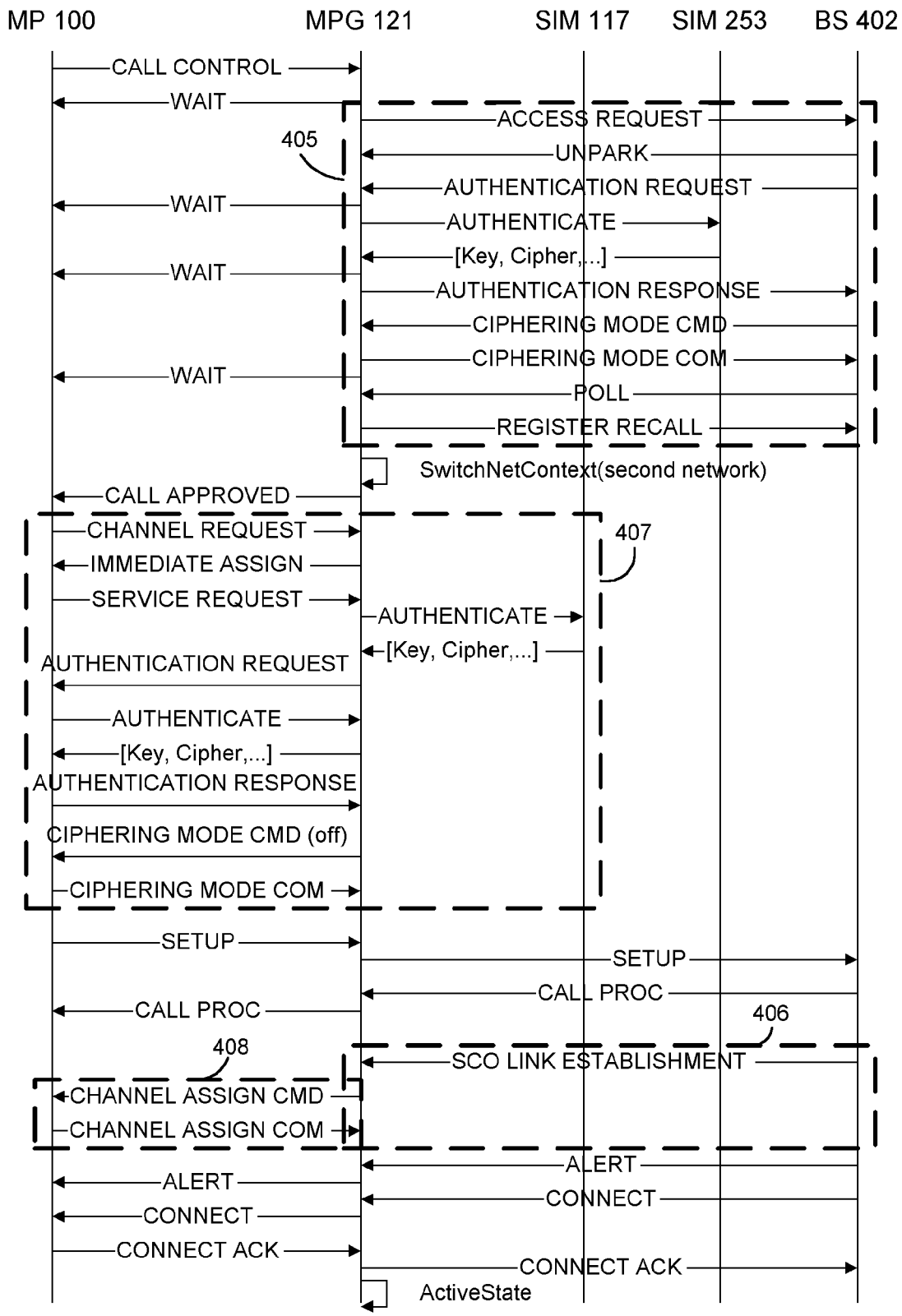
FIG. 13 is an interaction diagram illustrating mobile-originated call initiation for a GSM SIM-compatible MP where the call is routed through the second network, and where the second network is a Bluetooth network.

FIG. 13 is an interaction diagram of a mobile-originated call initiation phase, wherein the call is routed through the second network. This scenario begins as in FIG. 11 with a CALL CONTROL request issued by MP 100 through SIM interface 201. This time, however, MPG concludes the call should be routed through the second network. It then establishes a communication path between MP 100 and BS 402 of the second network. This communication path comprises two communication links, the first link established in sections 405, 406 between MPG 121 and BS 402, and named as the MPG-Network link, whereas the second link established in sections 407, 408 via D/S interface 202 between MPG 121 and MP 100, and named as the MP-MPG link.

To exit the SLEEP mode, MPG sends an ACCESS REQUEST to BS 402, which, according to Bluetooth protocol, is responded with an UNPARK message, and then with authentication and ciphering mode setup process. Following this, BS 402 sends a POLL request that is responded with a REGISTER CALL message, indicating that MPG wishes to issue a call. Then, MPG switches to the second network-context.

After approving the CALL CONTROL, MPG begins establishing the MP-MPG link by emulating a BS of the first network. This comprises: control channel assignment; authentication; and ciphering mode setting. In the scenario depicted in FIG. 13, authentication is handled by the MP's SIM card 117, and ciphering mode is turned off. This is the simplest scenario. Other scenarios are also possible, wherein authentication is handled by MPG's own SIM card logic 253 and ciphering mode is turned on. In either scenario, MPG stores the authentication and ciphering keys for use during communication on the MP-MPG link.

A SETUP message is then transmitted by MP 100 on the MP-MPG link, and after converted to the format of the second protocol, transmitted by MPG 121 to BS 402, which in response, dials the number, sends back a CALL IN PROGRESS message, and allocates a Synchronous COmmunication (SCO) channel.

In response, MPG completes the establishment of the MP-MPG link by allocating traffic channels and notifying MP 100. At this point, a communication path between MP 100 and BS 402 has been established, and MP 100 and MPG wait for completion of the call initiation process. When connection has been acknowledged by MP 100 and after passing this message to BS 402, MPG enters the ACTIVE state, wherein it receives, processes, and transmits packets in-between MP 100 and BS 402.

Figure 14:
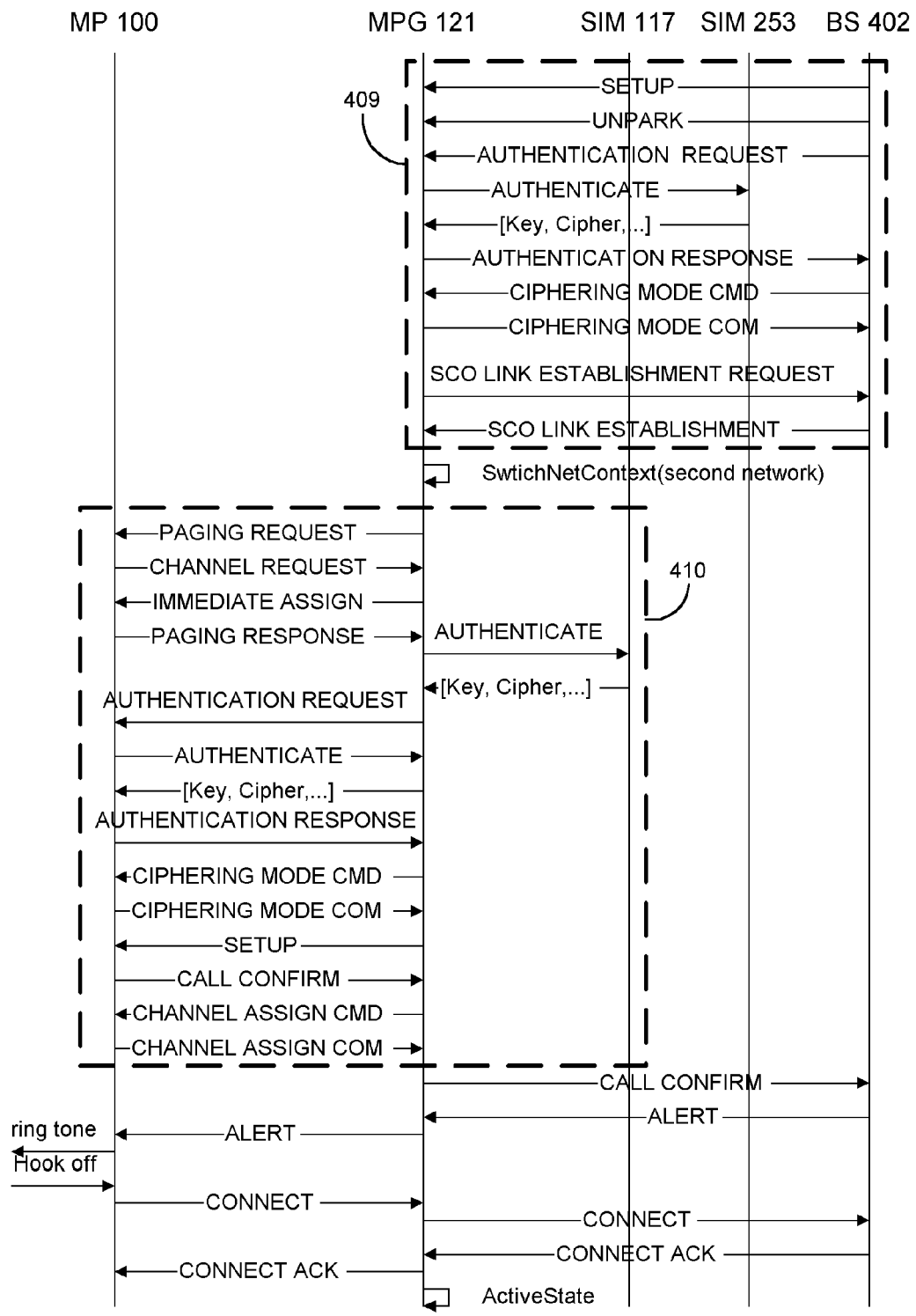
FIG. 14 is an interaction diagram illustrating mobile-terminated call initiation for a GSM SIM-compatible MP, where the call is issued by the second network, and where the second network is a Bluetooth network.

FIG. 14 is an interaction diagram of a mobile-terminated call initiation phase, wherein the call is issued by the second network. This scenario begins with a SETUP message sent by BS 402 to MPG 121, triggering the establishment of a MPG-Network link as specified in section 409. When receiving a SETUP message, MPG authenticates with BS 402 using SIM card logic 253. Once ciphering mode setting and traffic link establishment completes, MPG switches to the second network-context. Then it establishes the MP-MPG link through the D/S interface 202 by emulating a BS of the first network, and passing the call request data to MP 100 through the MP-MPG link. Since MPG intercepts interaction of MP 100 with SIM card 117, when receiving a MT CALL event through SIM interface 201, it approves it. The standard procedure of call confirmation, alerting, and connecting is then carried out in-between MP 100 and MPG 121 in conjunction with the same process being carried out in-between MPG 121 and BS 402. Once the call has been acknowledged, MPG enters the ACTIVE state.

During call initiation where the call is routed through the second network and MPG is configured for an r.f. D/S interface, MPG instructs MP 100 to reduce transmission power to the minimum required, in the same manner this is done when communicating on the first network.

In an embodiment of the present invention, the second network comprises one or more base stations BS 402. In yet another embodiment of the present invention, one or more base stations BS 402 are further provided as part of a communication system which comprises one or more MPGs, such that the MPGs facilitate communicating between the mobile phones and at least these base stations. For example, a residential communication system may comprise one or more MPGs, and one or more base units which are connected to the PSTN and/or to a broadband network, such that mobile phones which are coupled with these MPGs may communicate through these base units.

The scenarios of communication session establishment as disclosed above assume that an MP-MPG link may be readily established. A preliminary phase may however be required, wherein common network and protocol are being set for use by both the MP and MPG. This may be required in cases wherein the MP and/or MPG support more than one access technology, of which one has to be set prior to the establishment of an MP-MPG link. Further considerations in the selection and setting of an access technology include the potential of reducing design complexity, lowering power consumption, and/or a better adjustment to the type of communication session to be established. Setting a common access technology may be done in one of several methods, including: monitoring messages sent by the MP to SIM card 117, stating the supported access technologies and the selected access technology, and adjusting the MPG access technology over the MP-MPG path accordingly; actively setting the access technology applied by the MP to a desired one by manipulating messages and responses exchanged between the MP and SIM card 117 that relate to the selection and setting of an access technology by the MP; conducting signal analysis such as power density analysis on the signal produced by the MP through its r.f. D/S interface means.

FIG. 11-14 relate to a configuration of MPG wherein an external SIM card 117 is coupled with MPG for the purpose of communicating through the first network, while an internal SIM application means 253 is used when communicating through the second network. The adjustment to other configurations of MPG and SIM card logics may be done by first designating every SIM card logic by the communication network(s) with which it should be associated, and then replacing the SIM card logics as designated in these figures with the new ones. The adjustment to other configurations of MPG and SIM card logics may be done by first designating the SIM card logic assigned to each communication network, and then replacing the SIM card logics as designated in these figures with the new ones. In case a single SIM card logic is designated for both the first and the second network, a single activity line (vertical line) may be used in these figures to describe the interaction between this SIM card logic and MPG and the MP.

Furthermore, MPG may comprise a method for designating every SIM card logic by the communication network(s) with which it should be associated, and a method for identifying using these designations the SIM card logic, or SIM card logics, to which a SIM service request issued by either the MP or MPG, should be delegated. Using these methods, the assignment of a SIM card logic to a certain communication network becomes more flexible and may even be done dynamically by the user.

Variations of the scenarios described above, as well as other scenarios may be provided in similar manners. For example, an MPG may be provided which alters parameters of a mobile-originated call setup request received through the SIM interface, such as the telephone number or the bearer identification. This may be done in various phases, such as while establishing the communication session with the second network, or while confirming a SETUP request received through the SIM interface, particularly when routing the call through the second network, but may also be applied when routing the call through the first network.

Another type of variations of the scenarios described above relates to the sequences of operations conducted between MPG, MP, SIM card 117, and elements of the communication networks, as these sequences of operations may depend on the actual implementation of the devices involved (e.g., MP, SIM card 117, and network elements) and the communication protocols between them. For example, in a mobile-originated call initiation phase wherein the call is to be routed through the second network, the establishment of a MP-MPG link may be performed prior to the approval of a CALL CONTROL request through the SIM interface.

The call control scenarios described above demonstrate how a communication session may be established between the MP and a station of the second network through MPG. Another type of communication sessions is where the communication session is established directly between MPG and one or more stations of the second network. Here, MPG handles the communication as a standard mobile communication device, hence no MP-MPG link is required between the MP and MPG over D/S interface 202 during communication. Instead, during communication and also after its completion, MPG may provide status information and event notification to the MP or to the user through the MP. This can be done using one of the interfaces between MP and MPG (e.g., SIM interface 201, ACC interface 206), and/or through the user interface means and methods as introduced later in this document. In addition, MPG may access SIM card 117 for services such as data storage/retrieval, authentication, and interaction with SIM card applications. Some of the advantages of this type of communication are: the MP may still be available for communication through the first network while MPG communicates through the second network; no complex communication path setting and protocol conversion is required for such communication; communication through the first and the second networks may be conducted concurrently. Examples of types of communication sessions that may be conducted in this way include, but not limited to: SMS and MMS transmission and reception through the second network; file and program downloads; remote control applications; presence notification applications. For example, SMS messages may be sent or received by MPG and stored in SIM card 117 or in its own SIM card logic, notifying the user through SIM interface 201 only after completion of the communication.

Other variations and types of variations of the scenarios and their variations as described above may be provided by a person skilled in the art without departing from the scope and spirit of the present invention in its broadest form. Once a communication session has been established between MP 100 and the second network via MPG, MPG transpasses data/signaling between them so as to conform to the communication network and protocol with each side. In the following, examples of transpassing methods are provided in conjunction with the role of MPG, and assuming an r.f. D/S interface. It is noted, however, that in the digital baseband configuration and in the digital configuration, protocol conversion may reduce to protocol implementation related to the communication through the second network, since the payload format may be known in advance and the signaling method and content may be restricted to the level and protocol of the digital transmission medium. Other methods of transpassing as well as descriptions for the digital baseband and the digital configurations may be provided in similar manners by a person skilled in the art without departing from the scope and spirit of the present invention in its broadest form.

FIG. 15 shows key functions in the processing of a voice call in standard cellular networks such as GSM and CDMA. The relation to voice calls should be regarded as demonstrative rather than restrictive, since similar description can be made to non-voice calls, with most of the key functions and procedure of processing identical.

In the following descriptions, the term "channel" relates to a combination of allocation of time frames, packet segments, and frequency bands. For instance, in GSM, once a call has been established, all data and control channels are multiplexed on the same frequency band of each side, where control channels are multiplexed in two major forms: time frames specifically allocated for control channels, and ordinary time frames wherein the transmitted packet carries an indication bit signaling its content relates to a control channel. In contrast, in Bluetooth, each packet may carry control channels data on its header. Other, more complex allocations of time frames, packet segments, and frequency bands may be defined and applied as well.

Referring to FIG. 15, on the transmitter side, this process comprises: analog-to-PCM coding 501; voice coding 502, which compresses the digitized voice; digital encoding 503, comprising error correction/detection channel coding, data ciphering, message ciphering (e.g., as in UMTS), channels multiplexing, and packets interleaving; transmission 507 which transmits the signal by a transceiver.

Processing on the receiver side comprises: receiving of a signal 511 by a transceiver; digital decoding 515; voice decoding 516; PCM-to-analog conversion 517.

FIG. 16-17 show an embodiment of the present invention for the processing of a voice call in accordance with the processing shown in FIG. 15.

Referring to FIG. 16, MPG 121 electrically connects through D/S interface 202 with MP 100 for receiving packets, and wirelessly connects on the second network to BS 402 for transmitting packets.

CONF 576 is a configuration-dependent processing block that processes packets received on the D/S interface in accordance with the first protocol, with internal processing sub-blocks depended on the specific configuration of MPG. For an MPG configured for r.f.-form D/S interface with MP 100, CONF 576 comprises receiving a packet by transceiver 260. For an MPG configured for digital baseband form D/S interface, CONF 576 comprises passing a digital baseband data/signaling for processing by the digital signal processing section of MPG. For an MPG configured for digital-form D/S interface, CONF 576 comprises processing by bus adapter 273 to obtain physical, electrical and logical compatibility with internal bus 280. In either way, the output of CONF 576 is a digital packet in compliance with the format expected by the digital processing subsystem of MPG.

After being processed by CONF 576, processing proceeds in accordance with first protocol and comprises digital decoding 515. At this stage, signaling channels have been separated from data channels. The content of the signaling channels is then passed for processing by session control 550, whereas data is transcoded (560) in accordance with the coding scheme of the second protocol. Session Control 550 produces messages in accordance with the second protocol, based on: signaling messages received from MP 100; signaling messages received earlier from BS 402; MPG state; MP 100 state; and the state of the communication session. These signaling messages and transcoded data from transcoding 560 are then pre-processed for transmission on the second network, wherein pre-processing is in accordance with the second protocol and comprises: digital encoding 523; and transmission 309 by transceiver 257.

Referring to FIG. 17, MPG 121 wirelessly connects on the second network to BS 402 for receiving packets, and electrically connects with MP 100 on the D/S interface for transmitting packets.

When a packet arrives through the second network, it is processed by MPG, wherein processing is in accordance with the second protocol and comprises: receiving a packet 308 by transceiver 257, and digital decoding 535. At this stage, signaling channels have been separated from data channels. The content of the signaling channels is then passed for processing by session control 550, whereas data is transcoded (560) in accordance with the coding scheme of the first protocol. Session Control 550 produces messages in accordance with the first protocol, based on: signaling messages received from BS 402; signaling messages received earlier from MP 100; MPG state; MP 100 state; and the state of the communication session. These signaling messages and transcoded data from transcoding 560 are then pre-processed for transmission on the D/S interface 202, wherein pre-processing is in accordance with the first protocol and comprises: digital encoding 503; and CONF 586.

CONF 586 is a configuration-dependent processing block that prepares packets for transmission on the D/S interface in accordance with the first protocol, with internal processing sub-blocks depended on the specific configuration of MPG. For an MPG configured for r.f.-form D/S interface with MP 100, CONF 586 comprises transmission by transceiver 260. For an MPG configured for digital baseband form D/S interface, CONF 586 comprises passing the digital baseband signal to MP 100 through BC 259. For an MPG configured for digital-form D/S interface, CONF 586 comprises processing by bus adapter 273 to obtain physical, electrical and logical compatibility with the bus established between MP and MPG. In either way, the output of CONF 586 is a digital packet in compliance with the format expected by the MP.

In the embodiments explored in FIG. 16-17, MPG functions as a payload gateway and as a signaling gateway. There is, however, another method called "encapsulation" or "tunneling", wherein the gateway processes only the signaling portion of the communication session while leaving the processing of the payload portion to the terminals. The MPG-Network link in this method can be described as a pair of links: the carrier link which is the actual communication link between MPG 121 and BS 402, and the payload link which is a logical link between the application in MP 100 and the application in BS 402. The payload link is carried within the payload segments of packets of the carrier link, and is not transcoded by MPG, thereby reducing processing power requirements and device price and complexity. Therefore, this method is particularly useful for a gateway device coupled to a MP and powered by the same battery.

In particular, this method can be found useful for voice calls where the first network is a cellular network like GSM, CDMA, or UMTS, and the second network is a WLAN like Bluetooth. In the case of Bluetooth, this is because Bluetooth uses an up-to 64 KB/sec PCM coding of audio signal, requiring full time activity of RF 257, as well as substantial processing effort. Instead, an extension to the Cordless Telephone Profile can be defined and used in conjunction with MPG, such that the voice signal is efficiently encoded and compressed according to the coding scheme of the cellular network, thereby reducing transmission/reception activity on the second network while keeping voice quality as good as in the first network. For instance, using an 160 bits packet size of an SCO link between MPG 121 and BS 402 without additional encoding (there is no need since payload bits are already encoded by the MP), and where the first network is CDMA, requires only 4 cycles of 0.625 milliseconds (ms) transmission/reception time on the MPG-Network link in every 20 ms, compared with 16 cycles required for a standard Bluetooth audio link. This is because a standard CDMA packet is 576 bits on the uplink and 384 bits on the downlink, and thus can be packed into four packets of 160 bits.

Note that for the purpose of properly ciphering and de-ciphering the payload content transmitted to BS 402, MPG 121 first has to pass to it the ciphering key. This can be done by transmitting the de-ciphering key to BS 402 during the setup or the beginning of the communication session. Preferably, the de-ciphering key is ciphered by the ciphering key resulting from the authentication process carried out between MPG 121 and BS 402. Alternatively, or in addition, a method may be provided, according to which authentication with, or through, the second network is delegated to SIM card 117. Such a method facilitates accepting services from a service provider or network operator which is common to both the first and the second network or which is accessible through both networks. Such a method also facilitates concentrating all SIM data and services within SIM card 117, thus reducing the complexity and cost of MPG.

FIG. 18-19 illustrate an exemplary "encapsulation" method applied to a processing of a voice call by BS 402 of an exemplary second network that is also equipped with means and methods for processing and/or communicating data of the first protocol.

FIG. 18 shows the processing of packets of a voice call by BS 402, wherein: packets are received through the second network in accordance with the second protocol, but with payload in accordance with the first protocol; processing is done in two phases. In the first phase, processing is in accordance with the second protocol and comprises: receiving a packet 531 by a transceiver; unpacking 571, wherein unpacking comprises de-multiplexing carrier link signaling channels from carrier link data channels.

Carrier link signaling channels are then further processed, wherein processing is in accordance with the first protocol and comprises message decoding 573, wherein message decoding comprises message channel decoding, and message de-ciphering (in UMTS). The output is passed to session control 580 for further processing. Session control 580 processes messages in accordance with the second protocol, based on: signaling messages received from the transmitting terminal; the state of BS 402; and the state of the communication session.

Carrier link data channels are passed for second stage processing, wherein processing is in accordance with the first protocol and comprises: digital decoding 515; voice decoding 516; and PCM-to-analog conversion 517.

FIG. 19 shows the processing of packets of a voice call by BS 402, wherein: packets are transmitted through the second network in accordance with the second protocol, but with payload in accordance with the first protocol; and processing is done in two phases. In the first phase, processing is in accordance with the first protocol and comprises: analog-to-PCM conversion 501; voice encoding 502; digital encoding 503. The output is passed to packing 583 for further processing.

Messages are produced by session control 580 in accordance with the second protocol, based on: signaling messages received earlier from the receiving terminal; the state of BS 402; and the state of the communication path. Messages produced by session control 580 are processed in accordance with the second protocol, wherein processing comprises: message encoding 581, wherein message encoding comprises message channel encoding, and message ciphering (in UMTS). The output is passed to packing 583 for further processing.

The processing in the second phase is in accordance with the second protocol and comprises: packing 583 data and signaling streams into transmission buffers, wherein packing comprises multiplexing signaling stream into the carrier link signaling channels and data stream into the carrier link data channels, and digital encoding; transmission 527 by a transceiver.

Figure 20:
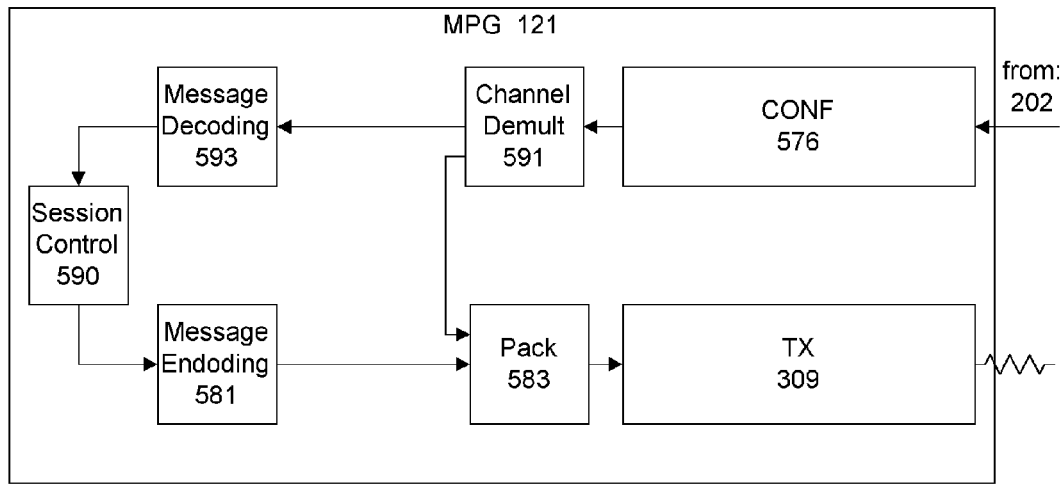
FIG. 20-21 schematically illustrate protocol conversion of a voice call by MPG, done in accordance with the encapsulation method illustrated in FIG. 18-19.
Figure 21:
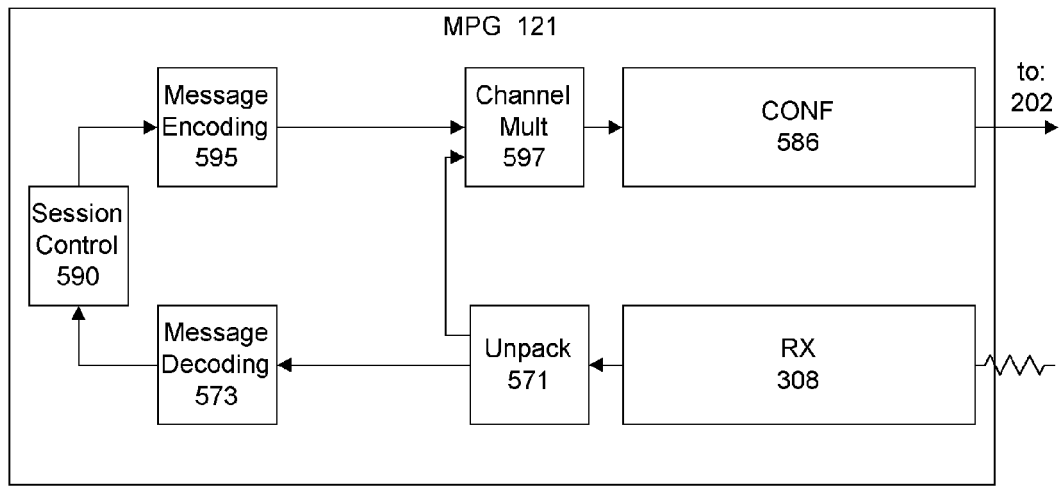

FIG. 20-21 show an embodiment of the present invention for the processing of a voice call in accordance with the encapsulation method shown in FIG. 18-19.

Referring to FIG. 20, MPG 121 electrically connects through D/S interface 202 with MP 100 for receiving packets, and wirelessly connects on the second network to BS 402 for transmitting packets.

CONF 576 is a configuration-dependent processing block as described earlier, whose output is a digital-representation of a packet received on the MP-MPG link.

After being processed by CONF 576, processing proceeds in accordance with the first protocol and comprises channels de-multiplexing 591, wherein signaling channels are de-multiplexed from data channels. Signaling channels content are then further processed, wherein further processing comprises message decoding 593, after which the messages sent by MP 100 are ready for processing by session control 590.

Session control 590 produces messages in accordance with the second protocol, based on: signaling messages received from MP 100; signaling messages received earlier from BS 402; MPG 121 state; MP 100 state; and the state of the communication session. These messages are then processed in accordance with the second protocol, wherein processing comprises message encoding 581. The output of message encoding 581 and the data stream of channels de-multiplexing 591 are passed for further processing, wherein further processing is in accordance with the second protocol and comprises: packing 583; and transmission 309 by transceiver 257.

Referring to FIG. 21, MPG 121 wirelessly connects on the second network with BS 402 for receiving packets, and electrically connects with MP (100) on the D/S interface for transmitting packets.

When a packet arrives on the second network, it is processed by MPG, wherein processing is in accordance with the second protocol and comprises: receiving a packet 308 by transceiver 257; and unpacking 571, wherein unpacking 571 comprises de-multiplexing carrier link signaling channels from carrier link data channels.

Carrier link signaling channels are then further processed, wherein processing is in accordance with the first protocol and comprises message decoding 573, wherein message decoding comprises message channel decoding and message de-ciphering (in UMTS). The output of message decoding 573 is passed to session control 590 for further processing.

Session control 590 processes messages in accordance with the second protocol, based on: signaling messages received from MP 100; signaling messages received earlier from BS 402; the state of MPG; the state MP 100; the state of the communication session. These signaling messages are then pre-processed in accordance with the first protocol, wherein processing comprises: message encoding 595. The output of message encoding 595 and the data stream output of channels unpacking 571 are passed for further processing, wherein further processing is in accordance with the first protocol and comprises: channel multiplexing 597; and CONF 586. CONF 586 is a configuration-dependent processing block as described earlier, whose input is a digital-representation of a packet to be transmitted on the MP-MPG link.

Another encapsulation method that may be provided is characterized by that some of the payload channels are transcoded while other payload channels are tunneled, the content of a transcoded payload channel is passed through a transcoder prior to being packed or multiplexed with the other channels.

Another encapsulation method that may be provided is characterized by that data and control bit-streams related to the communication between MP 100 and the second network constitute the payload portion of packets exchanged between MPG and the second network. Control signaling between MPG and the second network is then carried out via control channels of the second network.

Other encapsulation methods may be provided in similar manners.

FIG. 22-25 schematically illustrate communication links and communication paths that may be established in conjunction with MPG. In these figures, PLMN 600 is the first network, Protocol A is the first protocol, NETB 601 is the second network, ACC NET 602 encompasses accessory device-related communication links, Protocol B is the second protocol, ST 603 is a station of the second network, and DT 604 is a wireless data terminal of the second network.

Figure 22:
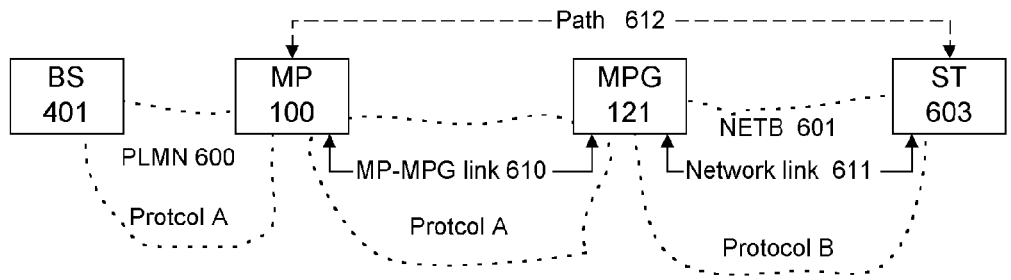
FIG. 22-25 are schematics showing various communication paths that may be established by MPG in accordance with the present invention.

FIG. 22 illustrates a communication path 612, established between MP 100 and ST 603, comprising: an MP-MPG link 610 following Protocol A; and a MPG-Network link 611 following Protocol B.

Figure 23:
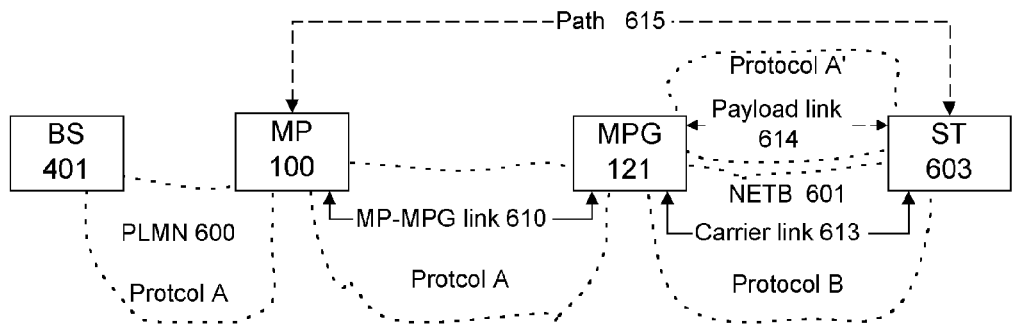

FIG. 23 illustrates a communication path 615, established between MP 100 and ST 603, comprising: an MP-MPG link 610 following Protocol A; a carrier link 613 following protocol B; and a payload link 614 overlaid on the payload portion of carrier link 613, with content following protocol A' which is the application-layer part of protocol A.

Figure 24:
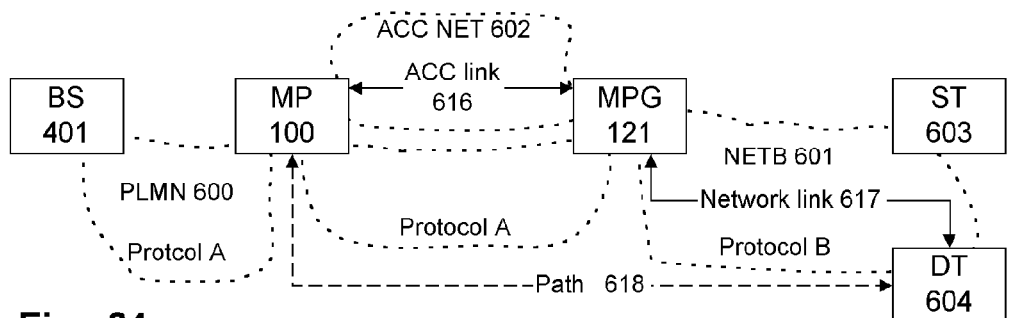

FIG. 24 illustrates a communication path 618, established between MP 100 and DT 604, comprising: a ACC link 616 between MP 100 and MPG 121 and following an accessory device interface protocol supported by them; and a MPG-network link 617 following Protocol B.

Figure 25:
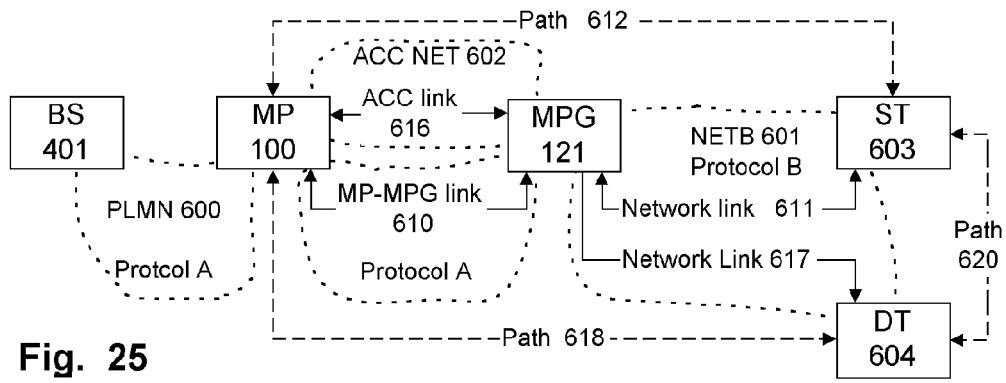

FIG. 25 illustrates a communication path 620, established between DT 604 and ST 603, comprising: communication path 618 established between DT 604 and MP 100 as depicted in FIG. 24; and communication path 612 established between MP 100 and ST 603 as depicted in FIG. 22 or 23.

Figure 26:
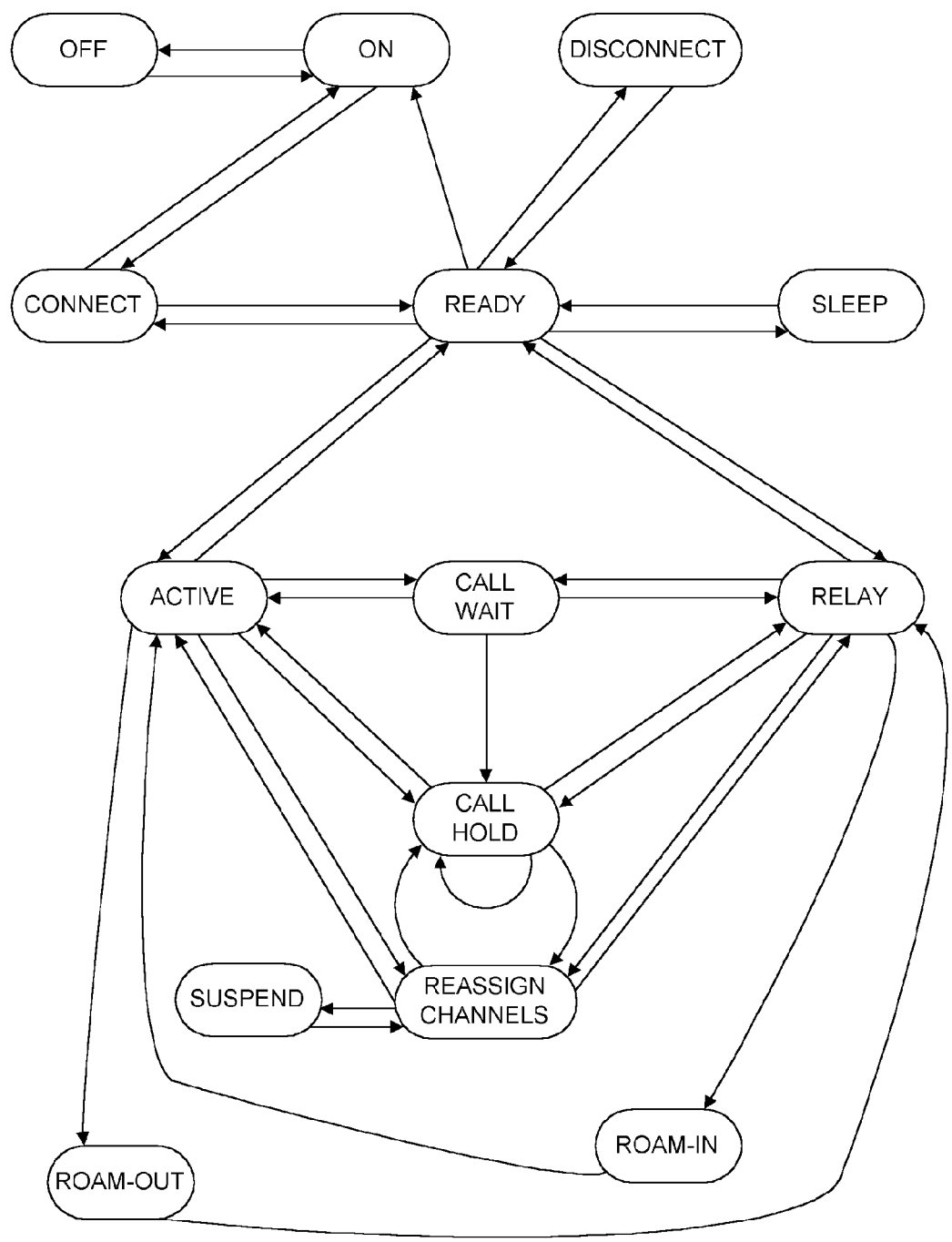
FIG. 26 is a state transition graph of MPG.

FIG. 26 is an illustration of a state transition graph for an MPG. Initially, MPG is in OFF state, wherein only features related to handling menu events issued through SIM interface 201 are active. This provides the user with an interface for powering on MPG from the MP's user interface. When powered on, MPG switches to the ON state, wherein no connection is yet established between MPG and the second network. This may be a transition state between the OFF state and the CONNECT state wherein MPG tries to establish a connection. It may, however, be a static state in case MPG is not expected to automatically connect to the second network.

When in CONNECT state, MPG tries establishing a control link with the second network. If succeeded, it switches to the READY state, wherein it is able to handle incoming and outgoing calls routed through the second network. After a pre-specified idle time, MPG may enter the SLEEP state, wherein it monitors the paging channel of the second network less frequently.

When a call is being routed through the first network while MPG is in READY state, it enters the RELAY state, wherein it waits for completion of the call.

When a call is routed through the second network, MPG enters the ACTIVE state, wherein it processes packets exchanged between MP 100 and stations and data terminals of the second network.

MPG may reside in RELAY or ACTIVE state while simultaneously residing in one of the states: CALL WAIT, CALL HOLD, REASSIGN CHANNELS, SUSPEND, ROAM-IN, or ROAM-OUT.

While in RELAY state, MPG monitors the paging channel of the second network, using SIM proactive commands such as beeping to signal the user whenever a paging request is recorded, and enters the CALL WAIT state.

While in ACTIVE state, an MPG configured for r.f. D/S interface and equipped with an antenna circuitry operative on both the first and the second networks, listens to the paging channel of the first network. When receiving a paging request, MPG inserts a CALL WAIT message into the message transmission buffer on the MP-MPG link, and enters the CALL WAIT state. While in CALL WAIT state, MPG monitors SIM interface 201 for keypad events signaling call-switching requests issued by the user.

When receiving a call-switching event, MPG first lets a CALL HOLD message to be sent to the network of the current call, and then enters the CALL HOLD state. If there is another call on the other network, MPG switches to the network-context of the network of the call and activates it. Otherwise, it waits for a CALL RESUME keypad event, upon which it returns to either RELAY or ACTIVE state in accordance with the communication network of the call resumed.

States REASSIGN CHANNELS, SUSPEND, ROAM-IN, and ROAM-OUT are applicable only for an MPG with r.f.-form configuration of the D/S interface and with an antenna circuitry operative on both the first and second networks. Note, however, that an MPG with digital or digital baseband configuration may still support roaming in-between the first and the second networks by providing this feature in similar manner to its provision by other mobile communication devices such as mobile phones.

When routing a call through the second network, MPG assigns traffic channels to the MP-MPG link. When switching to a call routed through the first network, the network might assign different channels to the call. In communication protocols like GSM, the MP expects the two calls to be assigned the same traffic channels. Therefore, when such a case occurs, MPG enters the REASSIGN CHANNELS, wherein it changes the traffic channels assigned to the MP-MPG link to be the same as the channels assigned to the call on the first network. This situation may occur during the initiation of the call but also during the call itself.

In some situations, MPG might not be able to reassign channels to the call on the first network, in which case the communication session of this call enters the SUSPEND state until channels become available, e.g., due to termination of a call.

When the first and second networks support roaming a call from one network to the other, MPG may support also the ROAM-IN and ROAM-OUT states.

Roaming-in occurs when the following conditions are met: a call is being routed through the first network; MPG enters the communication range of the second network; and preferences setting of MPG indicate that the call should be handed to the second network. When entering this state, MPG sends a message to the second network, requesting to hand the call to it from the first network. The second network is responsible for managing the handing process with the first network. When ready, it sends an acknowledgment message to MPG, which in response switches to the ACTIVE state. The switching process comprises: terminating the communication session with the first network; switching to the second network-context; and establishing a communication path between MP 100 and the second network.

Roaming-out occurs when the following conditions are met: a call is being routed through the second network; MPG goes out of range of the second network; and preferences setting of MPG indicate that the call should be handed to the first network. Either MPG or the second network may initiate a roam-out process. When entering this state, MPG sends a message to the second network, requesting to hand the call to the first network. The second network is responsible for managing the handing process with the first network. When ready, it sends an acknowledgment message to MPG, which in response switches to the RELAY state. The switching process comprises: terminating the communication session with the second network; switching to first network-context; and establishing a communication path between MP 100 and the first network.

The states and transitions illustrated in FIG. 26 highlight key characteristics of the present invention. Some states, such as those related to call-wait, call-hold, and roaming, are optional and depend on the availability of the functionality they apply. Also, additional states and transitions may be provided by an implementation or a certain configuration of MPG. As an example, a DOWN state may be added, wherein MPG is practically powered down, but MP 100 can freely communicate with devices associated with it via MPG, such as SIM card 117 and accessory devices. This state may be useful in various configurations of MPG, such as when MPG is bound to use only a power source it is equipped with, and that power source has drained out. Once this power source is being recharged, MPG may restore into action. Transitions from any state to the DOWN state may then reflect sudden power down, and transitions to ON state from various states may be added to reflect a link loss situation. Other states and transitions may be added by a person skilled in the art without departing from the scope and spirit of the present invention in its broadest form.

An adaptive scheduling method may be required in order to resolve synchronization issues involved in case of two protocols with substantial transmission/reception timing or bandwidth differences, and channel reassignment issues in embodiments where multiple sessions may be established with more than one network. Such a scheduling method is characterized in that: received packets are stored in memory and scheduled for processing; processing times are scheduled in-between receiving times and due transmission times; re-scheduling time is computed and the rescheduling process is scheduled for re-aligning processing by said mobile phone gateway with said receiving times and said due transmission times, such that minimal dropouts, jitter and delays occur as a result of processing by said mobile phone gateway.

Figure 27:
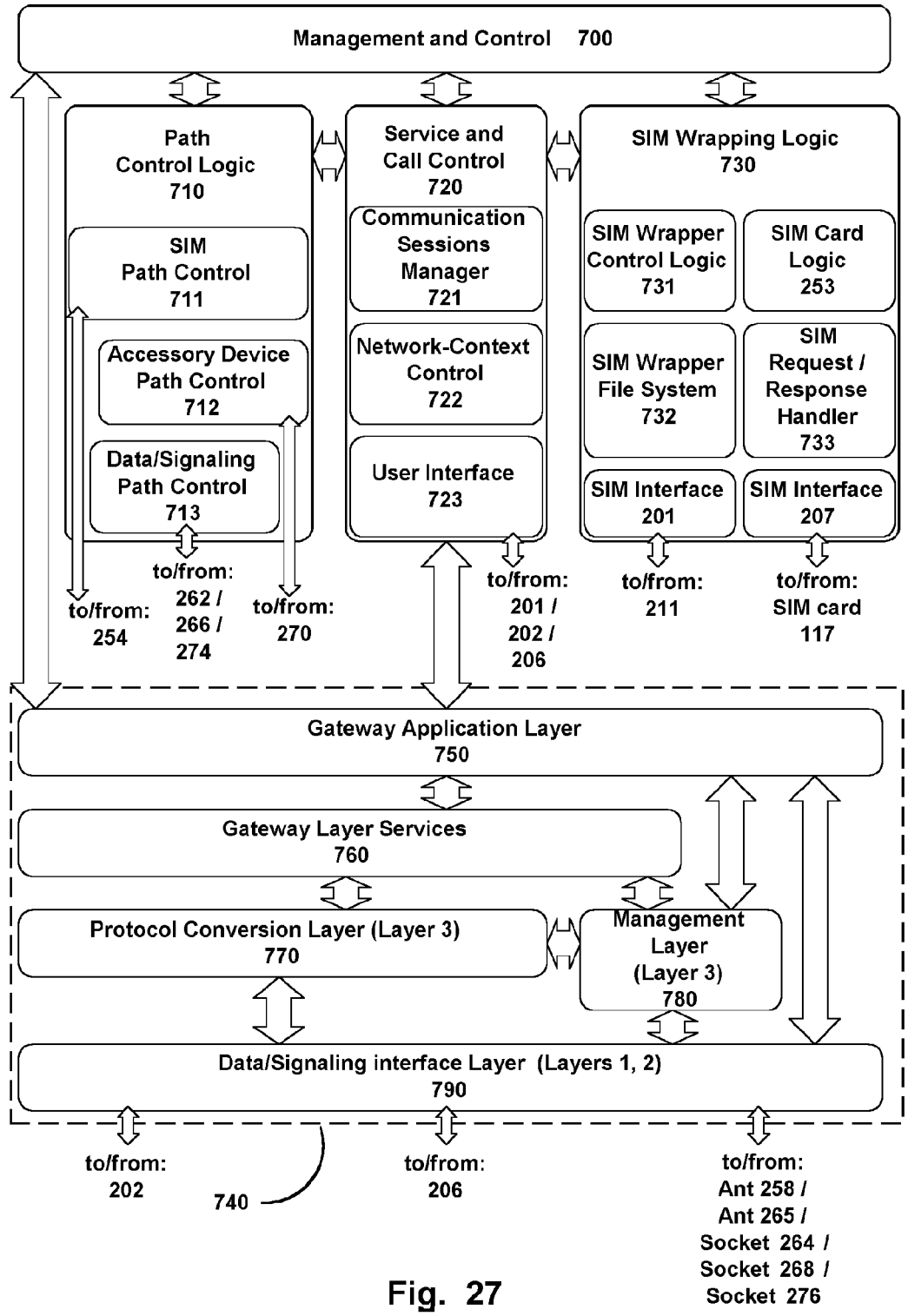
FIG. 27 shows key control modules, protocol stack layers and associated interface elements of MPG.

FIG. 27 illustrates an allocation into, and a logical arrangement of key control modules and protocol stack layers of MPG 121, and interface elements associated with them. As indicated earlier, such modules and elements may be implemented in accordance with various hardware and software technologies such as using ASIC, ASSP, general-purpose chipsets, and hardware-software codesign methodologies.

Management and control module 700 controls the operation of MPG.

Modules 710, 720, and 730 are control modules which some of their components may be active at all time even when MPG is in OFF state.

Path Control Logic 710 encompasses: SIM Path Control 711 which controls SIM switch 254; ACC path control 712 which controls communication links established through ACC interface 206 or through a communication interface common to network related data/signaling links and accessory device-related communication links; and Data/Signaling Path Control 713 which controls D/S path switch logic (262, 266, 274).

Service and Call Control module 720 comprises: Communication Sessions Manager 721 initiates and manages a plurality of communication sessions established between MP 100 and the second network through MPG; Network-Context Control 722 is responsible for switching between network-contexts; and User Interface module 723 which provides user interface services, using the user interface of MP 100 through either SIM interface (201), D/S interface (202), or ACC interface (206).

SIM Wrapping Logic 730 encompasses all SIM functionalities, including: accessing MPG's own SIM card logic 253 which may be implemented as a software module, a built-in SIM card, or a removable SIM card; SIM wrapper Control Logic 731 which directs SIM requests and responses to the appropriate SIM card; SIM wrapper File System 732 which builds upon the file systems of SIM card 117 and SIM card Logic 253 to provide a unified SIM file system to MP 100 and to MPG 121; SIM interface 201; and SIM Interface 207.

SIM Wrapping Logic 730 may also comprise methods for handling certain communication phases and communication procedures which may be conducted through a SIM interface in order to obtain proper initialization, coordination and operation of, and between, the MP, MPG and SIM card 117. For example, wrapping methods for the initialization phase may be provided, which ensure that the setting of interfaces 201 and 207 in terms of protocol properties such as bit rate, transfer mode (e.g., character mode vs. block mode) and synchronization method, are identical or at least easily transformable from one to another. As another example, a wrapping method may be provided for handling a procedure of authenticating a SIM card by, or through, the MP, such that MPG delegates authentication challenges and responses in-between the MP and SIM card 117, and monitors the authentication results (success or failure) and by-products (such as ciphering key). Another alternative to a SIM card authentication wrapping method may be to provide a proper SIM card authentication procedure as part of MPG. Other methods related to wrapping of SIM functionalities may be provided in similar manners.

SIM Wrapping Logic 730 as provided here conforms to an embodiment of the present invention wherein the SIM card logics associated with, or comprised within MPG, are an external SIM card 117 and an internal SIM card logic 253. Adjustments to other configurations may be provided by placing in or removing from SIM Wrapping Logic 730 SIM interface elements and SIM card logics which correspond to the specific configuration.

Gateway protocol stack 740 is a logical arrangement of functionalities implemented by MPG that are related to the implementation and realization of gateway applications and protocol conversion. Interaction between the control modules (700, 710, 720) and elements of the gateway protocol stack (740) takes place through the Gateway Application Layer (750), whereas communication between MPG and MP 100, and between MPG and the secondary network is handled by elements of the protocol stack.

Gateway Application Layer 750 encompasses gateway applications that may be embedded within MPG. In an embodiment of the present invention, Gateway Application Layer includes: Bluetooth profiles such as Cordless Telephone Profile, Intercom Services Profile, and Dial-Up Networking Profile; Bluetooth applications built on top of the Bluetooth profiles; Internet access by a WAP gateway application; advanced messaging serviced by i-Mode gateway application; and circuit-switched/packet-switched server which handles communication sessions wherein either the MP-MPG link or the MPG-Network link is a circuit-switched link, whereas the other link is a packet-switched link. In yet another embodiment of the present invention, Gateway Application Layer 750 includes: Mobile IP; mobile SIP client module for handling client-side SIP initiation and management session(s); mobile VoIP. In yet another embodiment of the present invention, Gateway Application Layer 750 includes: client-side IMS-compliant (or, equivalently MMD-compliant) session initiation, management and control module. Other gateway applications may also be embedded as part of this layer.

Gateway Layer Services 760 handles session control (550, 590), Quality of Service management, communication links and paths management, and scheduling.

Protocol Conversion Layer 770 handles transcoding of packets exchanged on the MP-MPG link and the MPG-Network link.

Management Layer 780 comprises third-layer entities required for interacting on the MP-MPG and MPG-Network links. These entities are used by modules of the gateway application layer, gateway layer services, and protocol conversion layer, for accessing the MP-MPG and MPG-Network links. For instance, in an embodiment wherein the first protocol is GSM, this layer comprises Communication Management (CM) entities, Mobile Management (MM) entities, and Radio Resource (RR) entities, using which communication through the MP-MPG link is carried out.

Data/Signaling Interface Layer 790 encompasses the logics of the data link and the physical layers of the protocol stack, using which MPG communicates with MP 100 through the D/S interface and through the accessory device interface, and with the second network through the second communication means.

The allocation and logical arrangement as illustrated in FIG. 27 are of a demonstrative nature, as other allocations and arrangements may be provided by a person skilled in the art without departing from the scope and spirit of the present invention in its broadest form.

In the area of telecommunication, the terms "multi-call" and "multi-session are used to describe a service of the network and a capability of the mobile phone to have more than one call/session open at the same time. In theory, the multiple calls/sessions may run concurrently. However, as of the time of issuing this description, only the non-concurrent stage is supported by mobile networks and phones, wherein only one call is active at any time, while the others are put into hold, and sessions are handled in a timesharing manner. As mobile communication technologies advance towards concurrent communication, MPG may be designed to provide or facilitate such a technology in similar manner to how it is being provided by other mobile communication devices in general, and mobile gateway devices in particular.

In the context of the present invention, the terms "multi-call" and "multi-session" may be extended to relate to a situation of having one or more calls/sessions open with each one of the first and second networks. This requires MPG 121 to be able to monitor the control and paging channels of the first network while in ACTIVE state.

From the description of the three MPG configurations and their related path-switches disclosed earlier, it is evident that only the r.f.-form configuration has been designed to support this capability. This is because filtering of network frequency bands is done by the transceivers (RF 257 and RF 260). Therefore, communication with the first network can run through MPG 121, merely requiring switching it to the multi-band antenna circuitry. Furthermore, because of the nature of the r.f. medium, MPG 121 can still listen to the paging channel of the first network while processing packets of the second network.

For the baseband-form and digital-form configurations, in addition to a multi-band antenna circuitry, the following modifications should be made in order to support multi-call/session: modifying the path-switch design and state-table; adding a transceiver for the first network, using it for processing incoming/outgoing signal to conform with the specifications of the first network on one hand, and with the form of communication with the MP on the other hand. These modifications are, however, straightforward, and once made, eliminate much of the difference between the three configurations from the point of view of the other elements of the present invention.

A further improvement relates to running simultaneous communication sessions on both first and second networks. This requires several modifications to be made to the design of MPG, including: adding session de-multiplexing module to the processing chain of the incoming signal on the D/S interface, just before processing by MPG or redirecting to the appropriate communication means with the network; adding session multiplexing module to the processing chain of the outgoing signal on the D/S interface, in between the processing modules and the signaling modules; when communicating through MPG's own network communication means (e.g., the multiband antenna circuitry), all communication means for the first and second networks have to be powered on to the extent that receiving/transmitting packets on both networks can be performed simultaneously, and in the r.f.-form configuration of MPG, a mixer has to be added to the transmission path for mixing the output of the transmitters of the two networks; in the digital baseband-form and digital-form configurations of MPG, when communicating through an accessory device (e.g., an external transceiver), multiplexer and de-multiplexer modules may be added to the processing chains of outgoing and incoming signals, respectively. Also, modifications to the processing and scheduling modules, and to the call control and session management modules of MPG may be required in order to facilitate this improvement. These modifications, are however straightforward, as most of them are already implied by the ability to serve multiple sessions running through a single network.

Up to this point, the description has concentrated on the extension of the communication capabilities of MP 100 to a single network and protocol designated as the second network and second protocol. The extension to multiple networks and protocols can be obtained by making certain modifications to the design of MPG, such as: adding multi-network communication means (e.g., a multi-band transceiver) for communicating through all extension networks; adding protocols implementation of the set of protocols of all extension networks; modifying the call initiation process and properties to consider all networks; providing means for attaching multiple SIM cards, SIM card logics, or SIM implementations; if more than one network communication means (e.g., multiple transceivers) are configured, modifying the power management method and the path-switch logic accordingly.

Another relaxation to the description so far relates to the assumption that SIM card 117 is the original SIM card of MP 100. In fact, any SIM card is suitable for use in conjunction with the present invention, provided it conforms to the interface requirements and connection specifications. Furthermore, extension of the present invention to multiple SIM cards can be achieved with the following key modifications to the design of MPG: adding multiple SIM card sockets and interfaces; modifying the SIM Wrapping Logic such that it is able to handle multiple SIM implementations; and modifying the call initiation methods to relate to multiple service providers.

When establishing a communication session with a core network through one or more intermediate networks, an intermediate network may be non-transparent to the communication session in the sense that it participates in the establishment and processing of the communication session. Issues such as registration, identification, authentication, call setup, ciphering, integrity check, and transcoding may then be carried out between the communication device and an intermediate network in addition or instead of being carried out between the communication device and the core network. An example of a non-transparent communication model is as described by the UMA specification, wherein a communication session may be established between a communication device and a GSM core network via a Bluetooth or WiFi access network. According to an aspect of the present invention, an MPG may be provided with means and methods for supporting communication with one or more core networks via one or more transparent and non-transparent intermediate networks. In the special case wherein the core network accessed via MPG is the same as, or share some characteristics with the core network of the first communication network, the design and implementation of an MPG may be adapted to take advantage of such similarities. As an example, an MPG may be provided with means and methods for supporting communication with a GSM core network of the first communication network via another radio access network such as Bluetooth or WiFi.

In the description so far, the concept of wrapping SIM functionalities has been demonstrated for call control and authentication services, using which MPG controls the communication network through which a communication session is established and the authentication procedure applied. This concept, however, is not limited to these types of messages, nor is it restricted to the wrapping method applied or to the manner in which wrapping of SIM functionalities is implemented. In fact, any SIM service, data object, event notification, or behavior may be wrapped by MPG in such manner that facilitates the manipulation of the wrapped functionality in order to implement an MPG functionality. Examples of such wrappings include, but not limited to: wrapping access technology event notifications and access technologies list exchange in order to control the access technology applied by the MP during a communication session, by dynamically setting and communicating to the MP the list of approved access technologies and the preferred access technology; wrapping timer events used to alert of awake a certain SIM service; wrapping of over-the-air downloading and programming, such that the download or programming procedure is directed to the appropriate SIM card or SIM logic. An example of a methodology in accordance to which SIM wrapping methods may be provided is the methodology of design patterns in object-oriented software engineering, wherein design patterns are defined which alter or modify the functionality of an object by wrapping it in front of the other objects. Other wrapping techniques, possibly based on other design or wrapping methodologies, may be provided by a person skilled in the art in order to wrap these and other SIM services and functionalities, without departing from the scope and spirit of the present invention in its broadest form.

In the description so far, session initiation, authentication, and mobility management have been demonstrated in relation to the second network alone. When, however, the second network functions as an access network to another network such as an Internet core network, more complex procedures for these issues may be applied. As an example, in an embodiment of the present invention, mobile VoIP may be supported using mobile SIP and Mobile IP. The details of an implementation of such a service are, however, similar in principle to prior art implementations of such services in mobile communication devices in general and mobile gateway devices in particular, with a major difference being that MPG maintains interoperability with the MP in both the access network level and the core network or the service level. As an example, in the scenario wherein a mobile-originated voice call is directed through the second network as illustrated in FIG. 13, after authenticating with the second network and establishing a communication link with it, a SIP-based session initiation procedure may be conducted with the core network over this link, in which an appropriate SIP address is negotiated with the core network in order to identify the called party. IP Mobility may then be managed and controlled by the session control module and the assigned gateway application. Further authentication and establishment of ciphering codes, such as in accordance with the EAP-SIM specification, may also be applied. Characteristics of the content, such as quality of service, may also be controlled by the session control module in conjunction with the assigned gateway application and with respect to the characteristics of the MP-MPG link.

The above description of the present invention has been provided for the purpose of illustrating and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments as are suited to the particular use contemplated. It is intended that the scope of the invention be defined by the following claims and their equivalents.

The invention claimed is:

1. A gateway operating system for a mobile phone gateway apparatus, said gateway operating system initiates, accepts, controls, manages, and terminates one or more communication sessions between a mobile phone and at least a second communication network by wrapping SIM (Subscriber Identification Module) functionalities, and provides gateway applications and protocol conversion services to said communication sessions, said gateway applications may be in compliance with the same or with different specifications; wherein: said mobile phone gateway apparatus provides wireless communication capabilities through at least second communication network in accordance with at least second communication protocol, to a mobile phone operative on at least first communication network in accordance with at least first communication protocol, said mobile phone comprising first SIM card socket, said first SIM card socket configured for detachably connecting to a SIM card, said mobile phone configured for communication with a SIM card through said first SIM card socket, said mobile phone gateway comprising: means for protocol conversion between at least said first protocol and said second protocol, means for data/signaling communication between said mobile phone gateway and said mobile phone through a non-transitory electrical signaling transmission medium, SIM card connector, matching to said first SIM card socket of said mobile phone, said SIM card connector configured for detachably connecting to said SIM card socket of said mobile phone, second SIM card socket, configured for detachably connecting to a SIM card, first SIM communication means, configured for communication with said mobile phone through said SIM card connector, second SIM communication means, configured for communication with a SIM card through said second SIM card socket, means for controlling and wrapping SIM functionalities, said SIM functionalities provided to said mobile phone and to said mobile phone gateway by one or more SIM card logics, said SIM card logics may be the same or different, said mobile phone gateway detachably connecting to said mobile phone through said SIM card connector of said mobile phone gateway and said first SIM card socket of said mobile phone, said mobile phone gateway communicating with said mobile phone by said SIM communication means through said SIM card connector; said mobile phone gateway controls and wraps said SIM functionalities with said means for controlling and wrapping SIM functionalities, said SIM functionalities are provided to said mobile phone through said SIM communication means and said SIM card connector of said mobile phone gateway.

2. A gateway operating system as in claim 1, comprising a plurality of methods for communicating with a plurality of SIM card logics, said SIM card logic comprised in or detachably connected to said mobile phone gateway.

3. A gateway operating system as in claim 2, comprising:
unified SIM services provided to said mobile phone and to said mobile phone gateway, based on SIM services of said SIM card logics.

4. A gateway operating system as in claim 3, wherein said unified SIM services comprises:
SIM wrapping control means for controlling interaction through a first SIM interface established between said mobile phone and said mobile phone gateway, and for controlling interaction between said mobile phone gateway and said SIM card logics;
SIM wrapping file system that builds upon the file systems of said SIM card logics, to provide a unified SIM file system to be accessed by said mobile phone and by said mobile phone gateway;
SIM wrapping methods for interacting as a SIM server with said mobile phone through said first SIM interface, and as a SIM client with said SIM card logics.

5. A gateway operating system as in claim 4, wherein a SIM wrapping method of said SIM wrapping methods comprises the steps of:
trapping events and requests issued by said mobile phone through said SIM card socket of said mobile phone; determining if an event or a request should be processed by said gateway operating system, or by one or more SIM card logic of said SIM card logics, or by both of them; if an event or a request should be processed by a SIM card logic, delegating events, requests, and responses in-between said mobile phone and said SIM card logic; if an event or a request should be processed by said gateway operating system, delegating events, requests and responses in-between said mobile phone gateway and said SIM card logics and in-between said mobile phone gateway and said mobile phone; synchronizing said SIM wrapper file system with the file systems of said SIM card logics.

6. A gateway operating system as in claim 1, comprising user interface methods for providing a user with control and access to the resources and services of said gateway operating system, and for facilitating interaction between services of said gateway operating system and a user, wherein interaction between said gateway operating system and the user is provided through said mobile phone.

7. A gateway operating system as in claim 1, comprising accessory device communication services for providing communication capabilities between said mobile phone and stations of at least said second network, said accessory device communication services comprising:
methods for the initiation, acceptance, management, control, and termination of communication paths between said mobile phone and said stations;
method for communicating with said mobile phone through an accessory device interface established between said mobile phone and said mobile phone gateway;
optionally, methods for controlling communication through a first accessory device interface means of said mobile phone gateway and a second accessory device interface means of said mobile phone gateway.

8. A gateway operating system as in claim 1, comprising an adaptive scheduling method characterized in that:
received packets are stored in memory and scheduled for processing; processing times are scheduled in-between receiving times and due transmission times; re-scheduling time is computed and scheduled for re-aligning processing by said mobile phone gateway with said receiving times and said due transmission times, such that minimal dropouts, jitter and delays occur as a result of processing by said mobile phone gateway.

9. A gateway operating system as in claim 1, comprising methods for the establishment of one or more communication paths between said mobile phone and stations of at least said second network through said mobile phone gateway.

10. A gateway operating system as in claim 9, wherein:
the establishment of a communication path comprises the establishment of one or more MP-MPG links between said mobile phone and said mobile phone gateway, and one or more MPG-Network links between said mobile phone gateway and one or more stations of said second network;
the establishment of any one of a MP-MPG link or a MPG-Network link comprises the steps of:
allocating uplink and downlink communication channels; authenticating; setting ciphering mode; and negotiating appropriate transmission power level.

11. A gateway operating system as in claim 2, wherein:
the establishment of a communication path between said mobile phone and a station of said second network through said mobile phone gateway comprises authentication;
when authenticating with said mobile phone, a first SIM card logic designated for authentication through said first network is used; when authenticating with said station, a second SIM card logic designated for authentication through said second network is used; authentication and ciphering keys produced during authentication with said mobile phone are stored to be used during call initiation and call processing phases with said station of said second network.

12. A gateway operating system as in claim 1, comprising means and methods for protocol conversion at least between said first protocol and said second protocol.

13. A gateway operating system as in claim 12, wherein a protocol conversion method is a transcoding method.

14. A gateway operating system as in claim 13, wherein said transcoding method comprises:
first processing thread, characterized in that: packets received through a MP-MPG link established between the mobile phone and the mobile phone gateway are processed using ciphering keys produced during call initiation phase and in accordance with a first protocol, obtaining first control data and first payload data; said first payload data is transcoded into a data format of a second protocol; said first control data is processed by said first processing thread; control messages produced by said first processing thread are multiplexed with transcoded payload data, resulting packets to be transmitted through a MPG-Network link established between the mobile phone gateway and a station of the second network;
second processing thread, characterized in that: packets received through said MPG-Network link are processed using ciphering keys produced during call initiation phase and in accordance with said second protocol, obtaining second control data and second payload data; said second payload data is transcoded into a data format of said first protocol; said second control data is processed by said second processing thread; control messages produced by said second processing thread are multiplexed with transcoded payload data, resulting packets to be transmitted through said MP-MPG link.

15. A gateway operating system as in claim 12, wherein a protocol conversion method is an encapsulation method.

16. A gateway operating system as in claim 15, wherein said encapsulation method comprises:
processing initiation phase wherein the ciphering keys using which the mobile phone encodes payload data are communicated to a station of the second network;
first processing thread characterized in that: packets received through a MP-MPG link established between the mobile phone and the mobile phone gateway are de-multiplexed into first control segments and first payload segments in accordance with a first protocol; said first control segments are processed using control data ciphering key produced during call initiation phase, and then processed by said first processing thread; said first payload segments are encapsulated within payload segments of packets of a second protocol; control messages produced by said first processing thread are multiplexed into control segments of packets of said second protocol, to be transmitted through a MPG-Network link established between the mobile phone gateway and said station;
second processing thread characterized in that: packets received through said MPG-Network link are de-multiplexed into second control segments and second payload segments of said second protocol; said second control segments are processed using control data ciphering key produced during call initiation phase, and then processed by said second processing thread; said second payload segments are encapsulated within payload segments of packets of said first protocol; control messages produced by said second processing thread are multiplexed into control segments of packets of said first protocol, to be transmitted through said MP-MPG link.

17. A gateway operating system as in claim 15, wherein said encapsulation method characterized in that:
data and control channels related to the communication between the mobile phone and the second network constitute the payload portion of packets exchanged between the mobile phone gateway and the second network; control signaling between the mobile phone gateway and the second network is carried out through control channels of the second network.

18. A gateway operating system as in claim 12, wherein a protocol conversion method characterized in that:
at least some of the data channels related to the communication between the mobile phone and the second network are transcoded; at least some of the data channels related to the communication between the mobile pone and the second network are encapsulated.

19. A gateway operating system as in claim 1, wherein:
while a communication session is conducted between said mobile phone and said first network, said gateway operating system listens to control and messaging channels of said second network;
while a communication session is conducted between said mobile phone and said second network through said mobile phone gateway, said gateway operating system listens to control and messaging channels of said first network.

20. A gateway operating system as in claim 2, comprising a mobile-originated call control method for handling a communication session originated by said mobile phone, said mobile-originated call control method comprises the steps of:

receiving a call initiation request from said mobile phone through a first SIM interface established between said mobile phone and said mobile phone gateway; determining the network through which the call should be routed; and applying network-dependent processing steps, such that:

when the call should be routed through said first network, said network-dependent processing steps comprises: delegating processing of said call initiation request to said SIM card; returning response to said mobile phone; switching to a first-network context, wherein data/signaling packets exchanged between said mobile phone and said first network are effectively not processed by said gateway operating system; and switching state to RELAY state, wherein said mobile phone gateway waits for a CALL DISCONNECTED event for a communication session conducted between said mobile phone and said first network to be issued by said mobile phone through said first SIM interface;

when the call should be routed through said second network, said network-dependent processing steps comprises: establishing a communication path between said mobile phone and said second network through said mobile phone gateway; switching to second-network context, wherein data/signaling packets exchanged between said mobile phone and said second network are effectively processed by said gateway operating system; converting call setup information in-between said first protocol and said second protocol; exchanging the converted call setup information in-between said mobile phone and said second network; determining the gateway application which will be handling the call; switching state to ACTIVE state, wherein said mobile phone gateway applies protocol conversion processing to a communication session conducted between said mobile phone and said second network through said mobile phone gateway; and passing control to said gateway application.

21. A gateway operating system as in claim 2, comprising a mobile-terminated call control method for handling a communication session originated by said first network, said mobile-terminated call control method comprising the steps of:

receiving an event through first SIM interface established between said mobile phone and said mobile phone gateway, said event indicating a mobile-terminated call is being established between said mobile phone and said first network; delegating events, requests, and responses in-between said first SIM interface and a SIM card logic of said SIM card logics, said SIM card logic designated for communication through said first network; switching to first-network context, wherein data/signaling packets exchanged between said mobile phone and said first network are not processed by said gateway operating system; and once a communication session has been established, switching state to RELAY state, wherein said gateway operating system waits for a CALL DISCONNECTED event for a communication session conducted between said mobile phone and said first network to be issued by said mobile phone through said first SIM interface.

22. A gateway operating system as in claim 2, comprising a mobile-terminated call control method for handling a communication session originated by said second network, said mobile-terminated call control method comprising the steps of:

receiving a paging request through the second communication means; establishing a MP-MPG link between said mobile phone and said mobile phone gateway; switching to second-network context, wherein data/signaling packets exchanged between said mobile phone and said second network are processed by said gateway operating system; sending a paging request to said mobile phone; establishing a MPG-Network link between said mobile phone gateway and a station of said second network; converting call setup information in-between said first protocol and said second protocol; exchanging the converted call setup information in-between said mobile phone and said station; determining the gateway application that will be handling the call; switching state to ACTIVE state, wherein said mobile phone gateway applies protocol conversion processing to a communication session conducted between said mobile phone and said station through said mobile phone gateway; passing control to said gateway application.

23. A gateway operating system as in claim 2, comprising one or more methods for directly conducting one or more communication sessions between said mobile phone gateway and one or more stations of said second network; optionally providing communication session event notification and status information to said mobile phone or to the user; and optionally requesting SIM services from said SIM card logics.

24. A gateway operating system as in claim 1, comprising inter-network services for providing inter-network call-wait services, call-hold services, and call-resume services.

25. A gateway operating system as in claim 1, comprising roaming services for handing over calls at least in-between said first network and said second network.

26. A gateway operating system as in claim 1, further comprising means and methods for selecting and setting a preferred radio access technology of said mobile phone.

27. A gateway operating system as in claim 1, wherein a gateway application of said gateway applications is in compliance with one or more specifications selected from: IMS; WAP; Mobile IP; mobile SIP; mobile VoIP; UMA; WiFi; WiMAX; i-mode; Bluetooth CTP; Bluetooth ISP; 3G-324M.

28. A gateway operating system as in claim 1, wherein said first network and said first protocol selected from: GSM, CDMA, UMTS, CDMA2000, TD-SCDMA, GPRS, EDGE, Bluetooth, IEEE 802.11, IEEE 802.15.3, IEEE 802.15.4, IEEE 802.16, IEEE 802.20, IEEE 802.22, DECT, WDCT, UMA, HIPERLAN, BRAN, HIPERMAN.

29. A gateway operating system as in claim 1, wherein said second network and said second protocol selected from: GSM, CDMA, UMTS, CDMA2000, TD-SCDMA, GPRS, EDGE, Bluetooth, IEEE 802.11, IEEE 802.15.3, IEEE 802.15.4, IEEE 802.16, IEEE 802.20, IEEE 802.22, DECT, WDCT, UMA, HIPERLAN, BRAN, HIPERMAN, DAB, DVB, DVB-T, DMB.

* * * * *